Dec. 16, 1952 C. B. HATFIELD 2,621,602
HYDRAULIC POWER DRIVE
Filed July 14, 1947 24 Sheets-Sheet 4

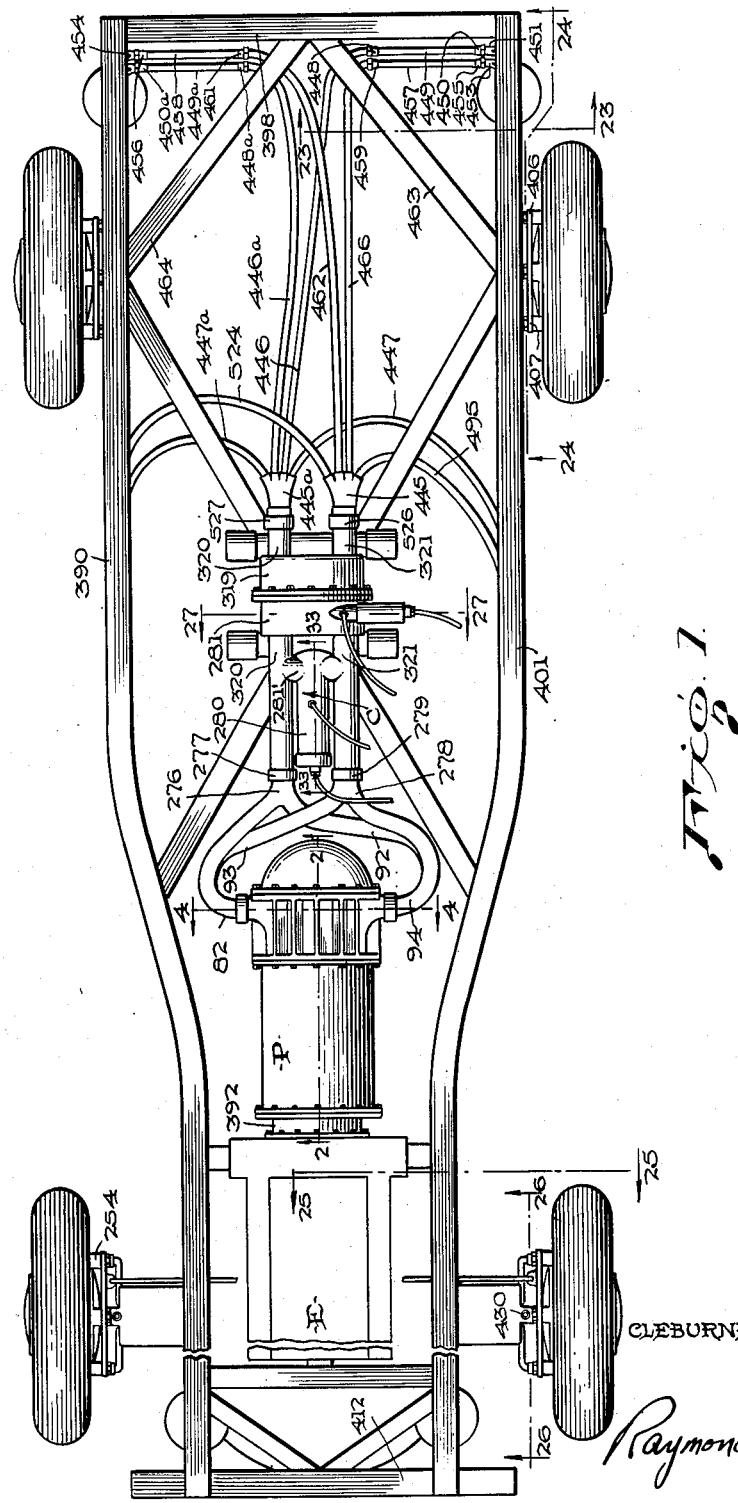

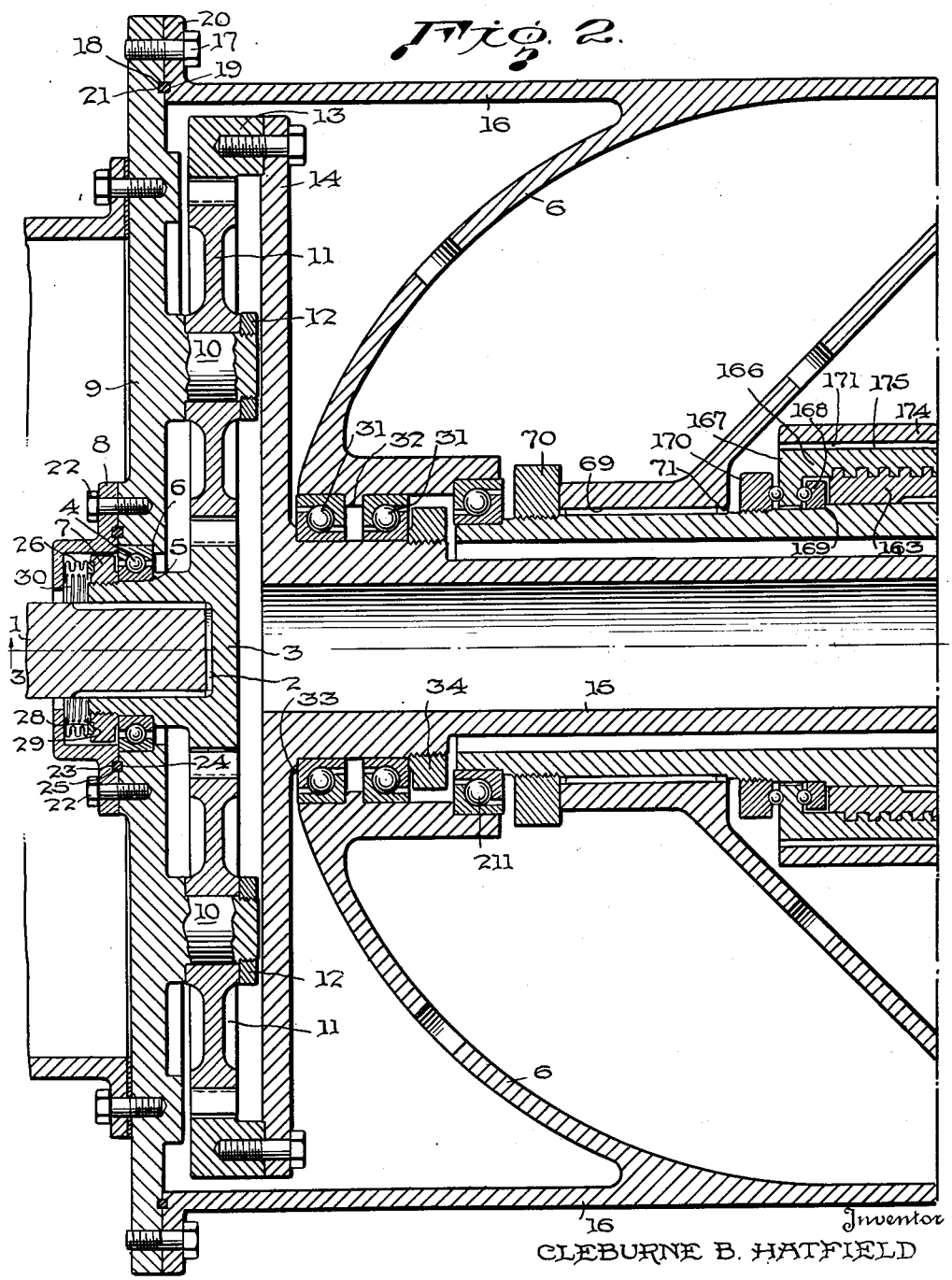

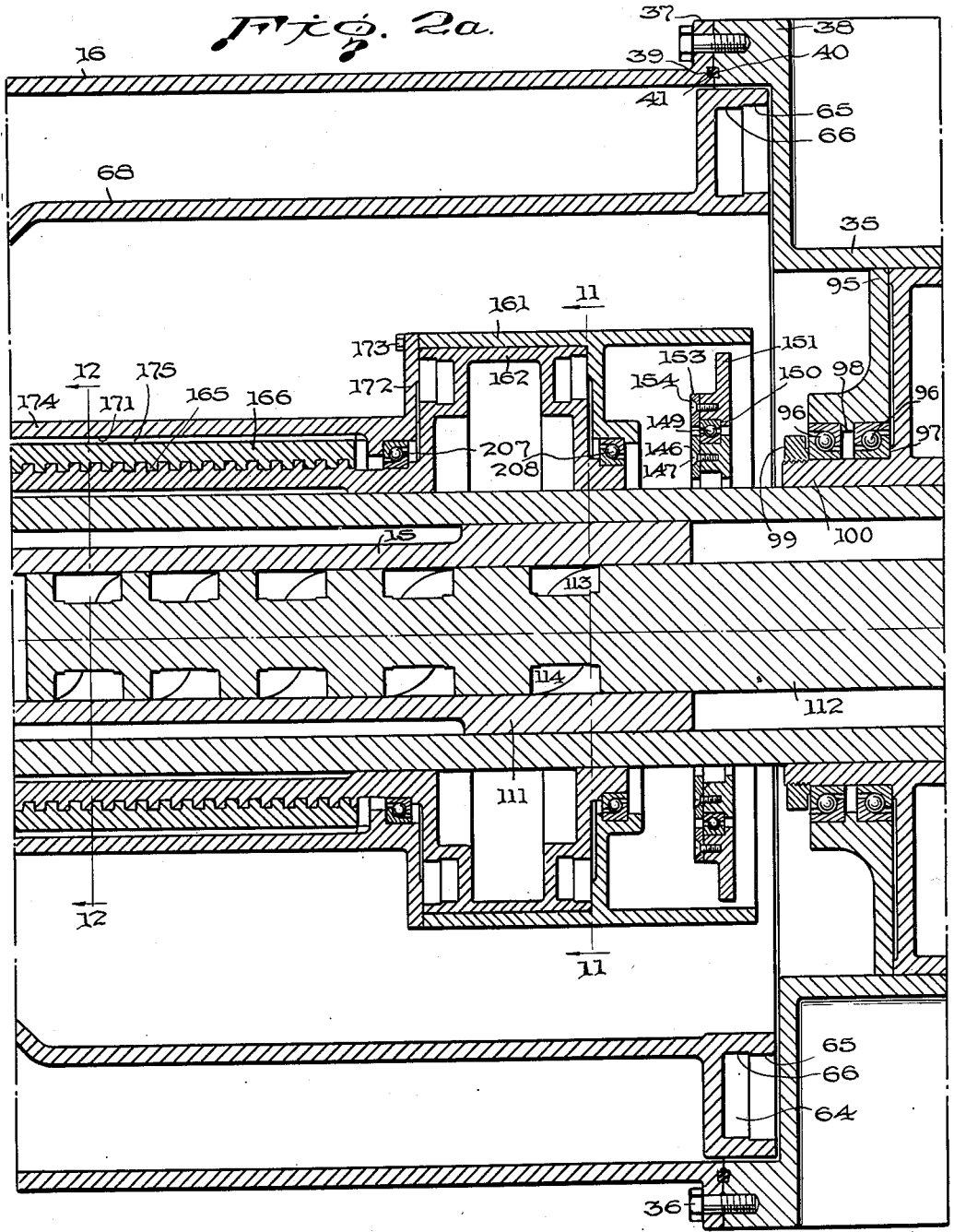

Inventor
CLEBURNE B. HATFIELD

By Raymond N. Matson
Agent

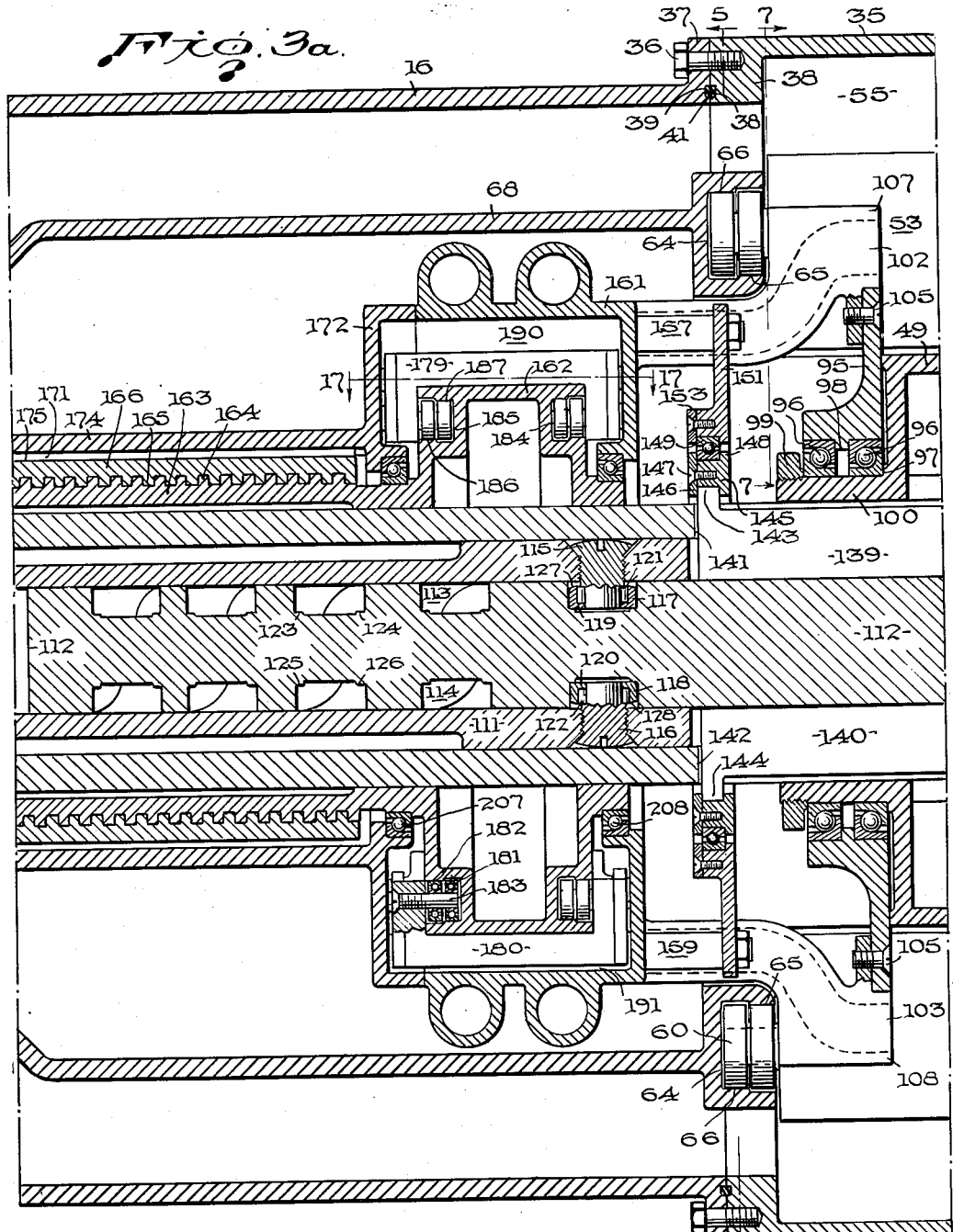

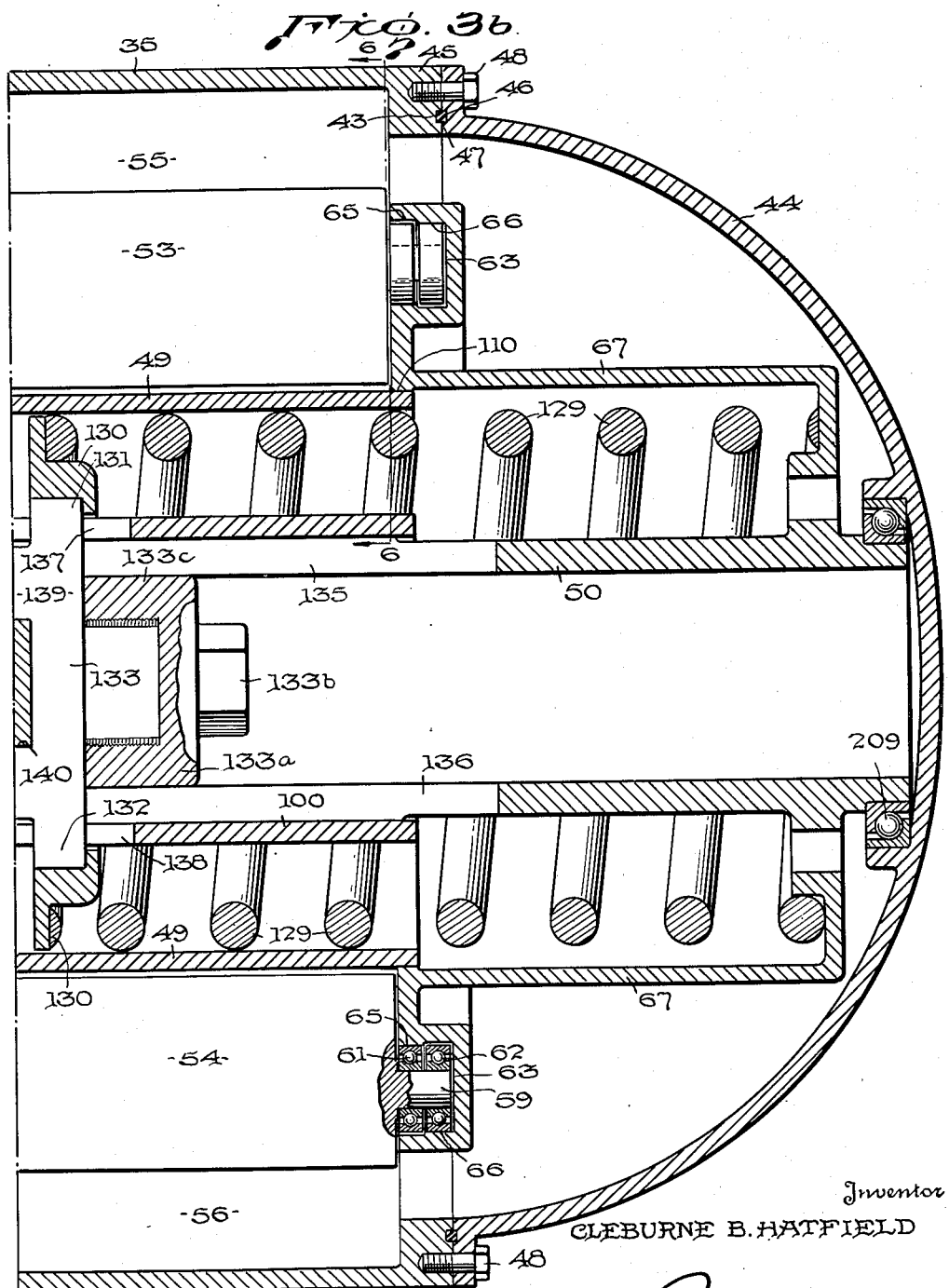

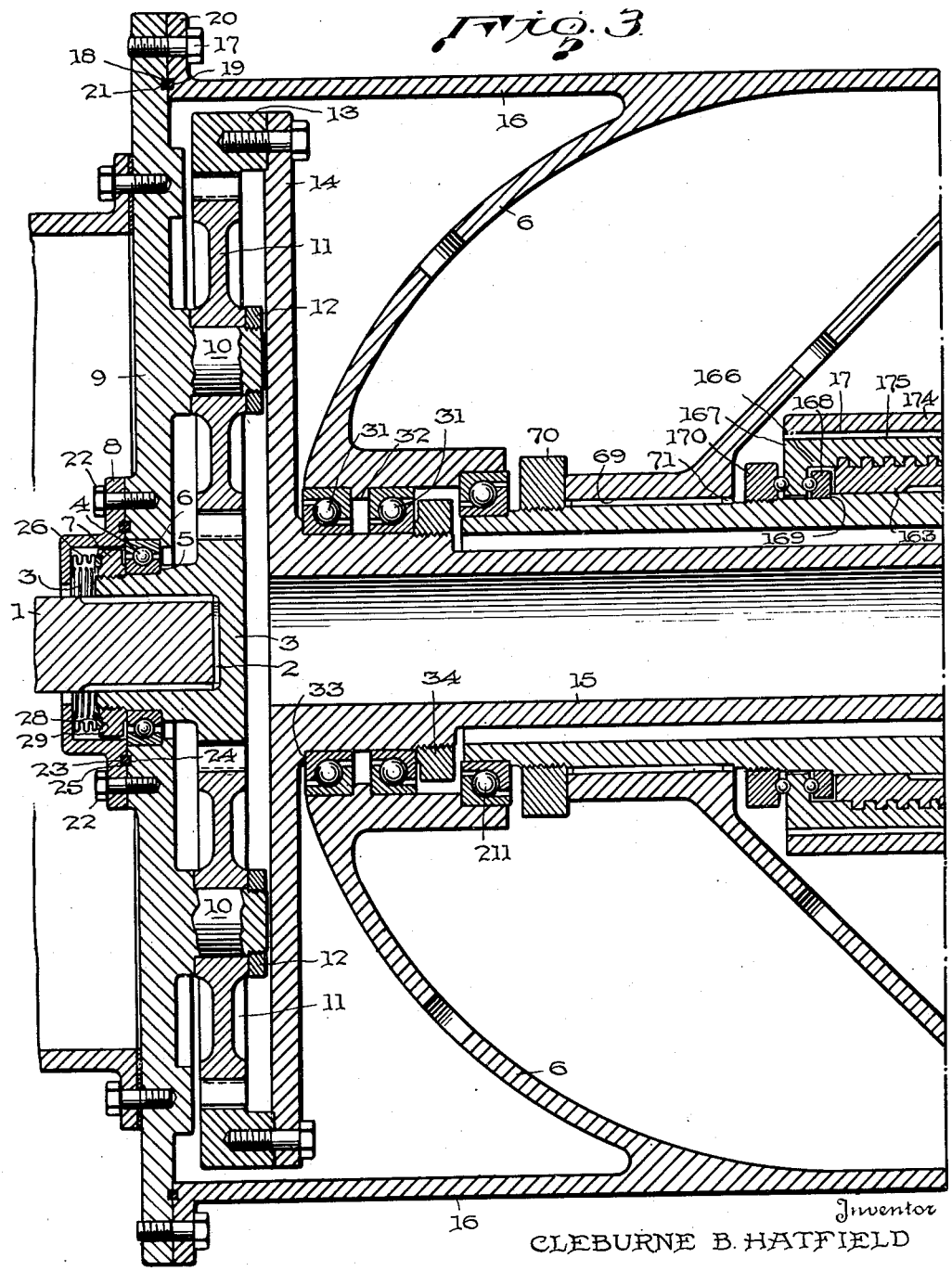

Dec. 16, 1952

C. B. HATFIELD 2,621,602

HYDRAULIC POWER DRIVE

Filed July 14, 1947

Inventor
CLEBURNE B. HATFIELD

By Raymond N. Mation
Agent

Dec. 16, 1952  C. B. HATFIELD  2,621,602
HYDRAULIC POWER DRIVE
Filed July 14, 1947  24 Sheets-Sheet 9

Inventor
CLEBURNE B. HATFIELD
By Raymond N. Metson
Agent

Dec. 16, 1952     C. B. HATFIELD     2,621,602
HYDRAULIC POWER DRIVE
Filed July 14, 1947     24 Sheets-Sheet 10
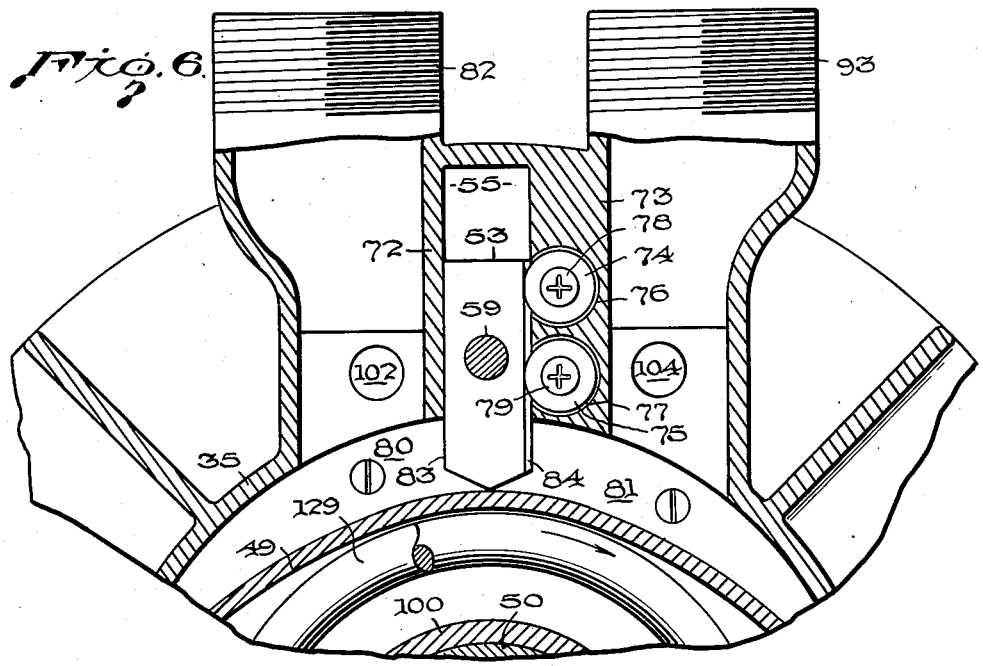
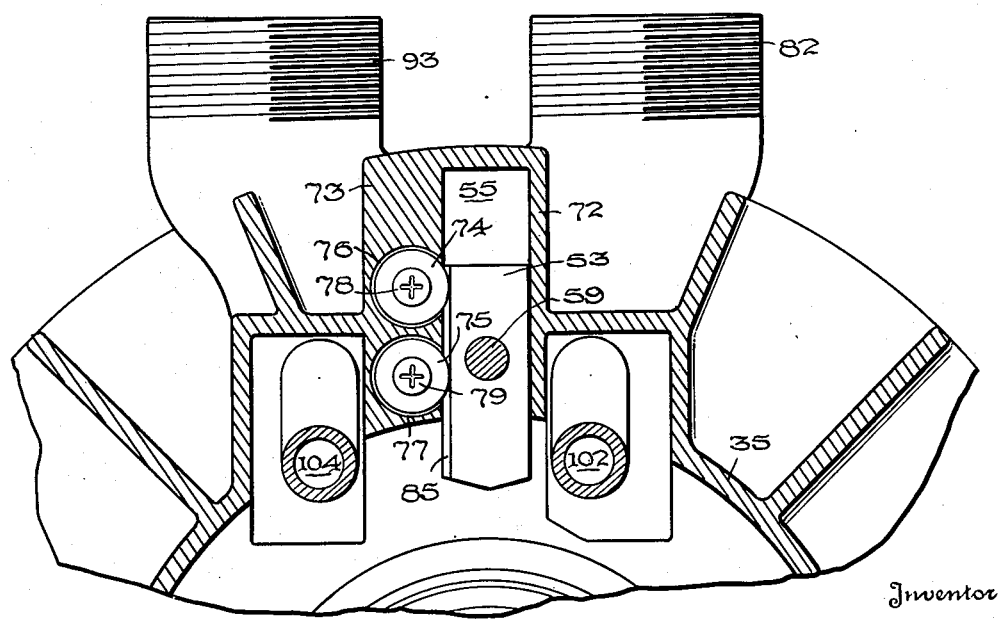
Inventor
CLEBURNE B. HATFIELD
By Raymond N. Matson
Agent Dec. 16, 1952 C. B. HATFIELD 2,621,602
HYDRAULIC POWER DRIVE
Filed July 14, 1947 24 Sheets-Sheet 11

Inventor
CLEBURNE B. HATFIELD
By Raymond N. Matson
Agent

Dec. 16, 1952 C. B. HATFIELD 2,621,602
HYDRAULIC POWER DRIVE
Filed July 14, 1947 24 Sheets-Sheet 12
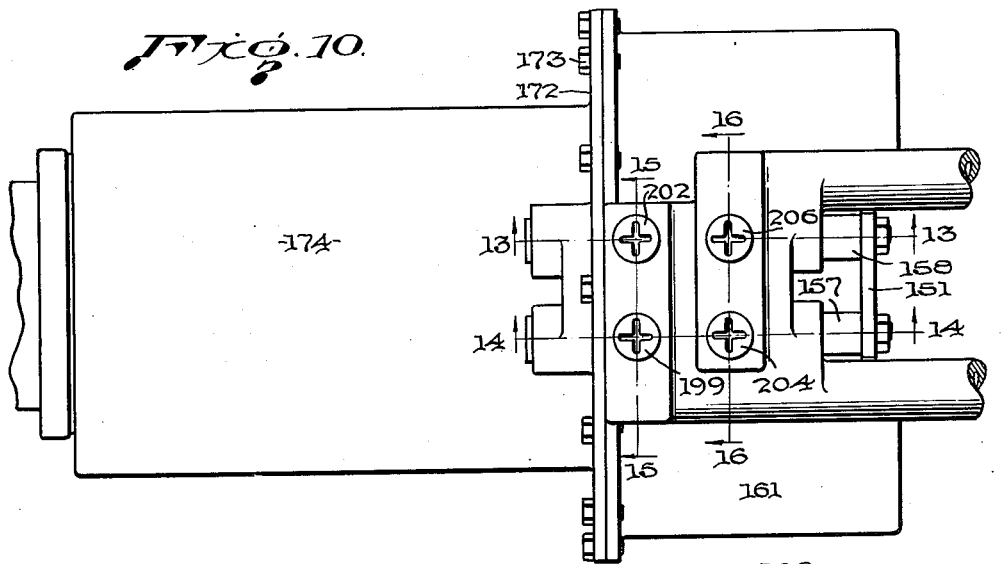
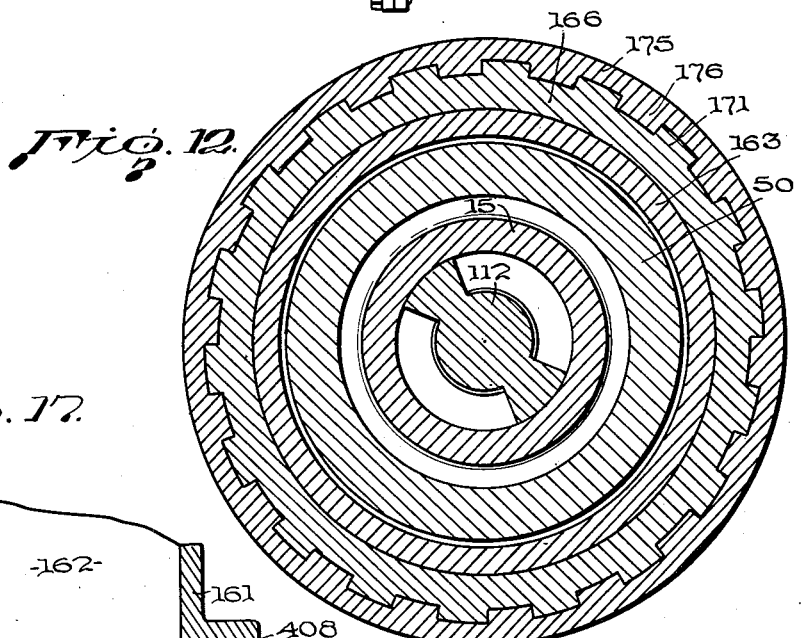
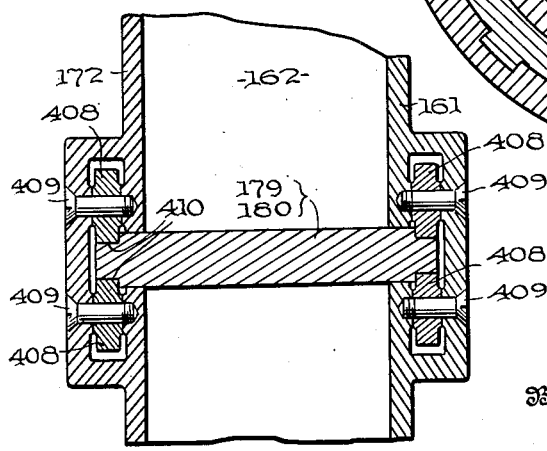
Inventor
CLEBURNE B. HATFIELD
By Raymond N. Matson
Agent Dec. 16, 1952 C. B. HATFIELD 2,621,602
HYDRAULIC POWER DRIVE
Filed July 14, 1947 24 Sheets-Sheet 13

Inventor
CLEBURNE B. HATFIELD

By Raymond N. Matson
Agent

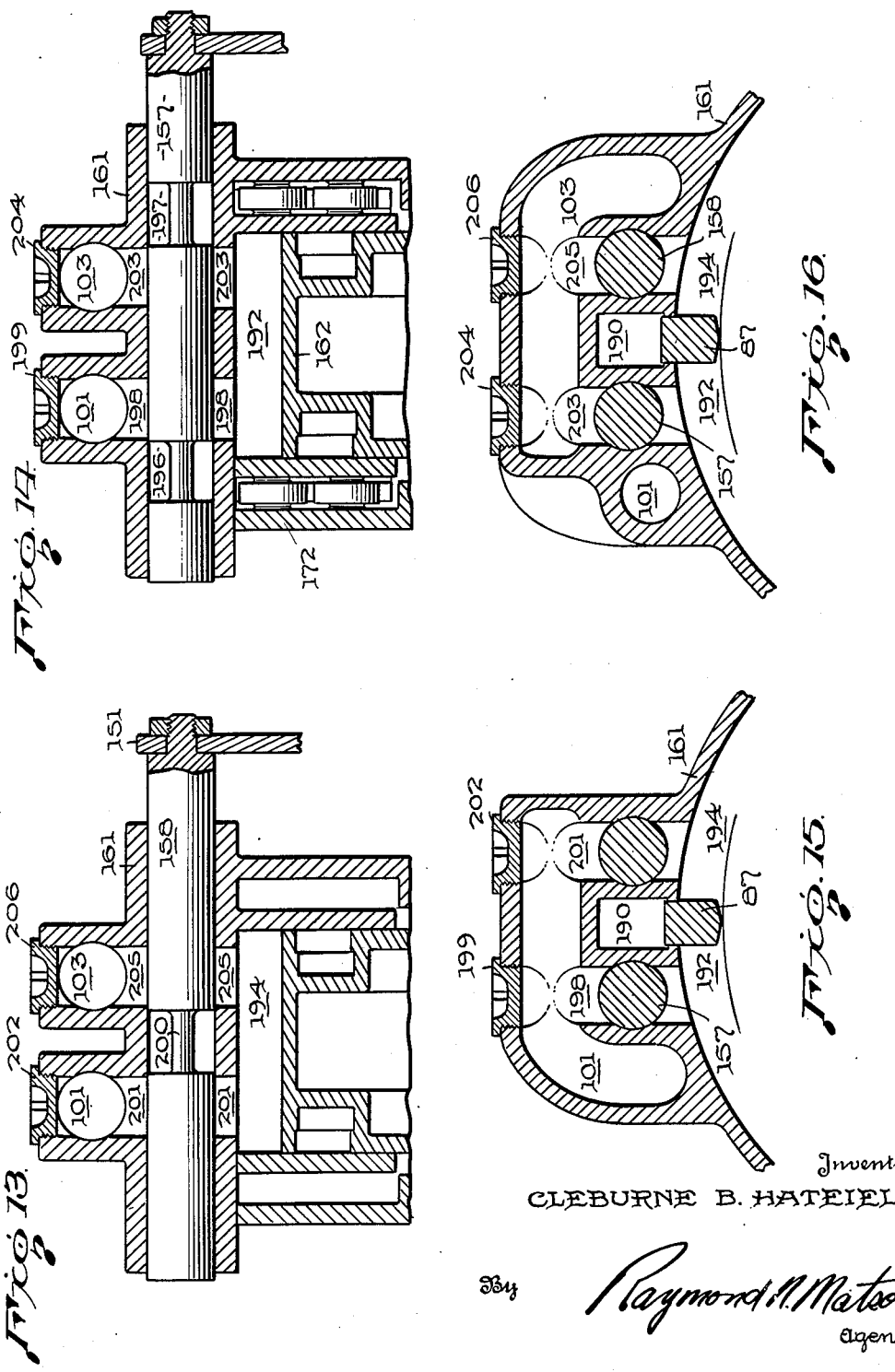

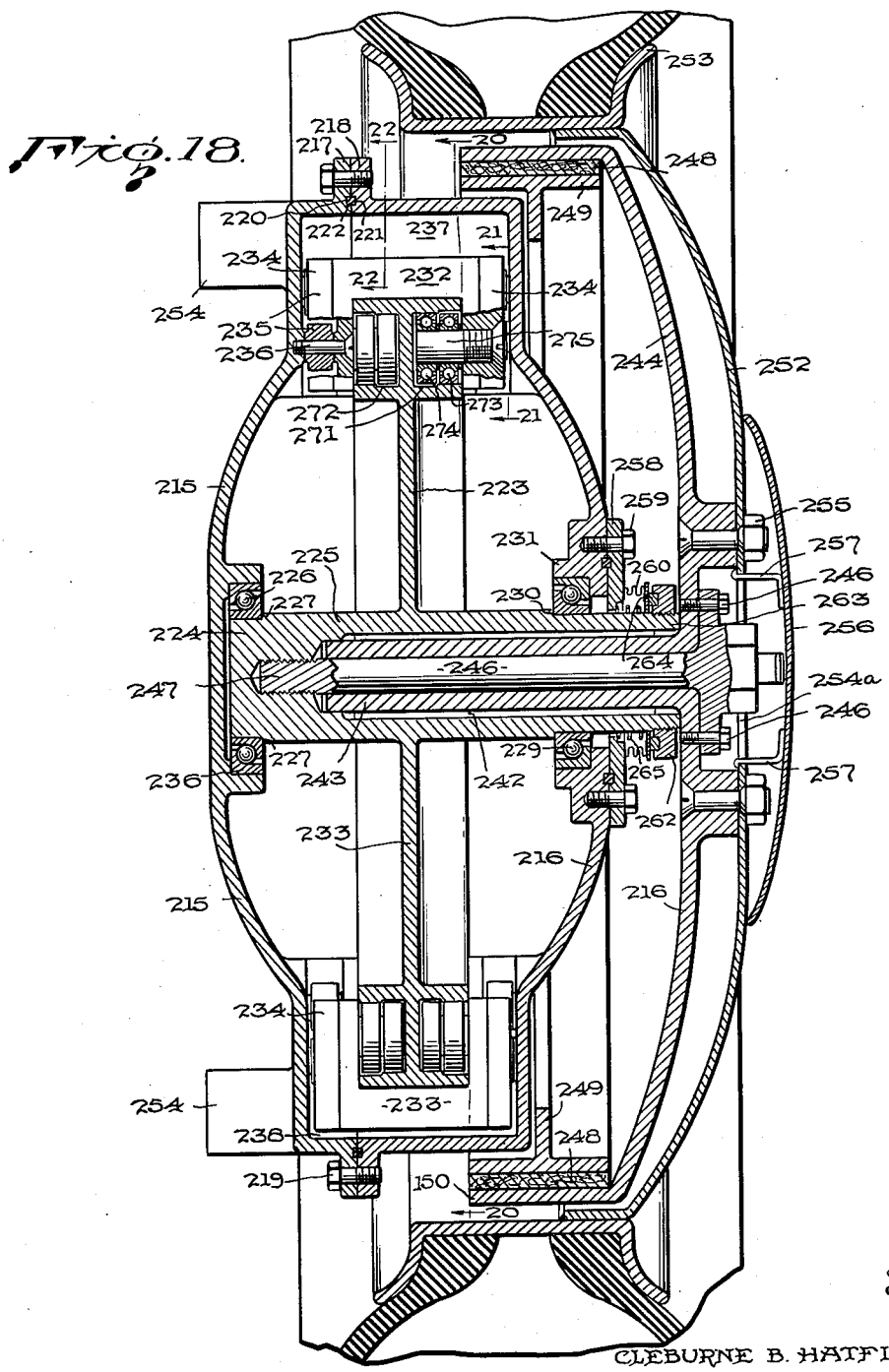

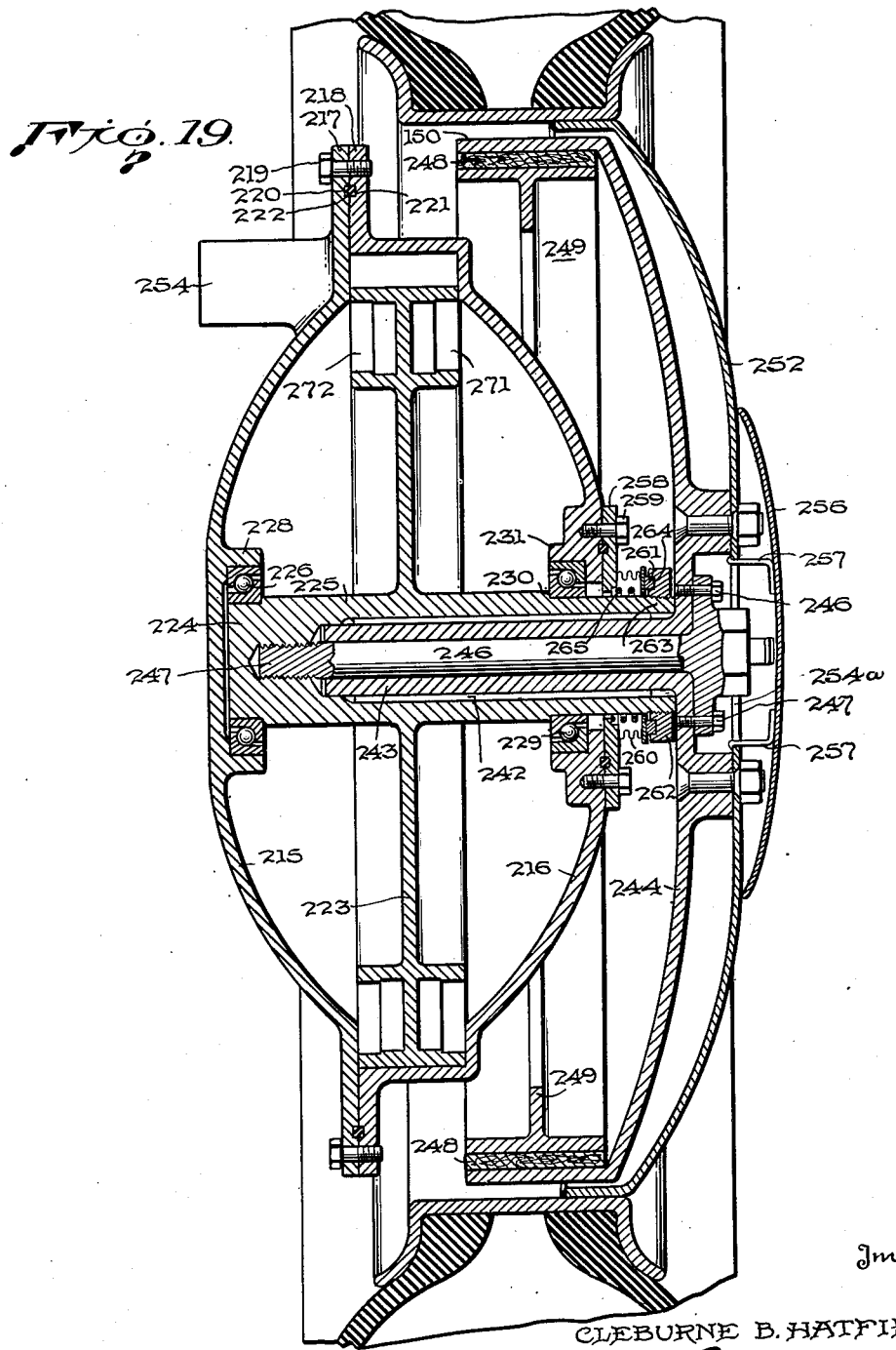

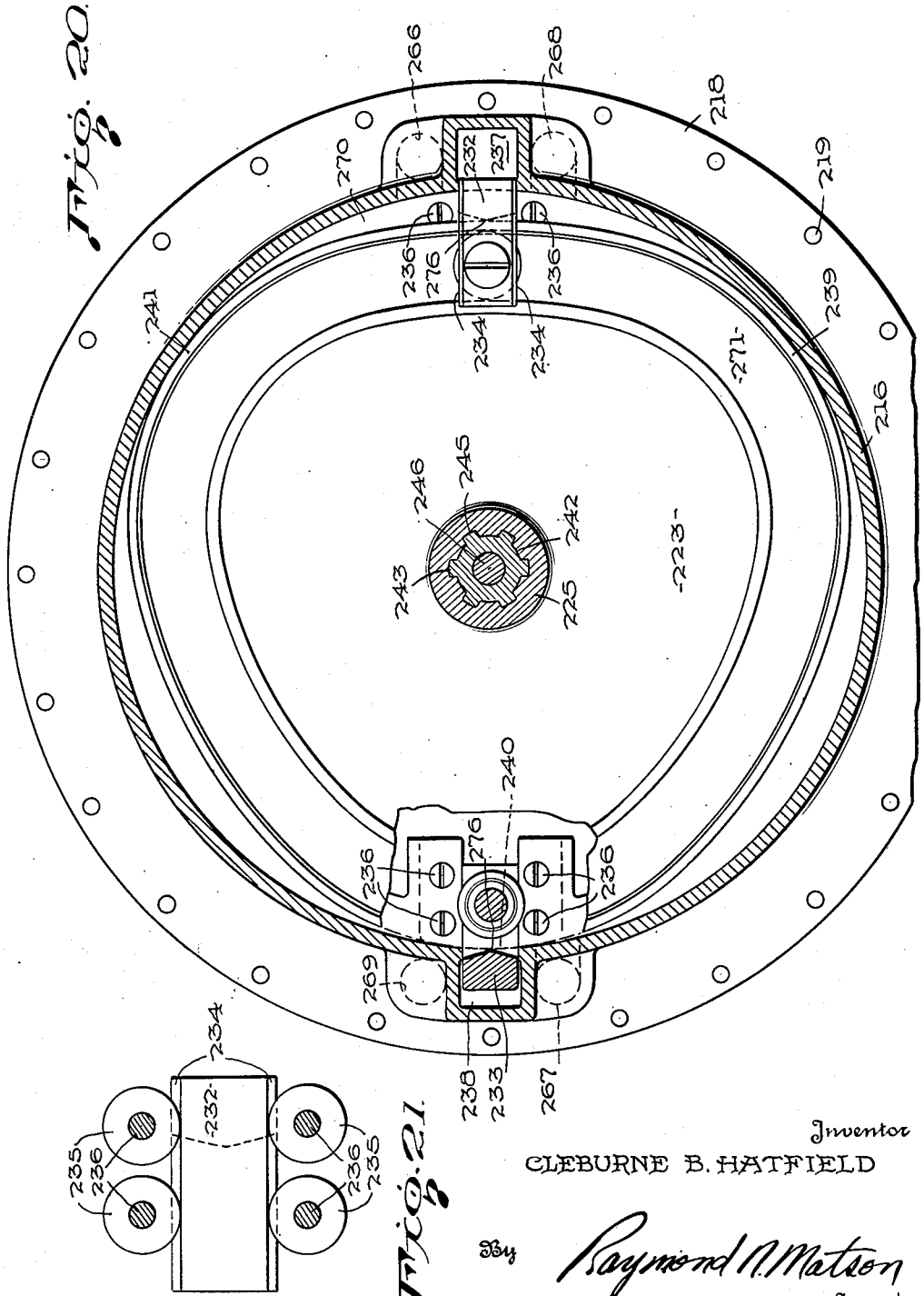

Dec. 16, 1952  C. B. HATFIELD  2,621,602
HYDRAULIC POWER DRIVE
Filed July 14, 1947  24 Sheets-Sheet 18

Inventor
CLEBURNE B. HATFIELD
By Raymond N. Matson
Agent

Dec. 16, 1952   C. B. HATFIELD   2,621,602
HYDRAULIC POWER DRIVE

Filed July 14, 1947   24 Sheets-Sheet 19

Inventor
CLEBURNE B. HATFIELD

By Raymond N. Matson
Agent

Dec. 16, 1952  C. B. HATFIELD  2,621,602
HYDRAULIC POWER DRIVE

Filed July 14, 1947  24 Sheets-Sheet 21

Inventor
CLEBURNE B. HATFIELD

By Raymond N. Matson
Agent

Dec. 16, 1952 C. B. HATFIELD 2,621,602
HYDRAULIC POWER DRIVE
Filed July 14, 1947 24 Sheets-Sheet 22

Inventor
CLEBURNE B. HATFIELD

By Raymond N. Matson
Agent

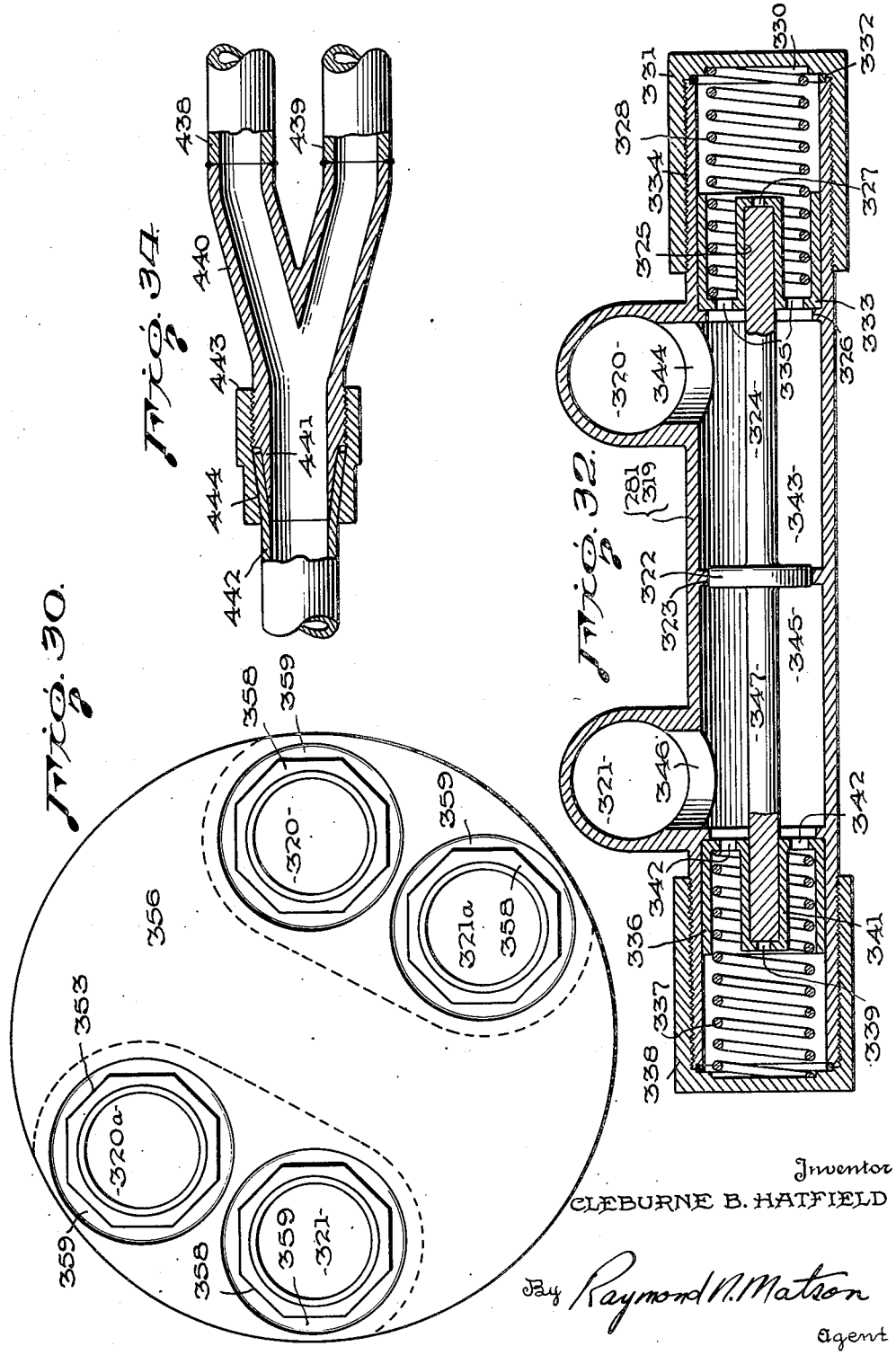

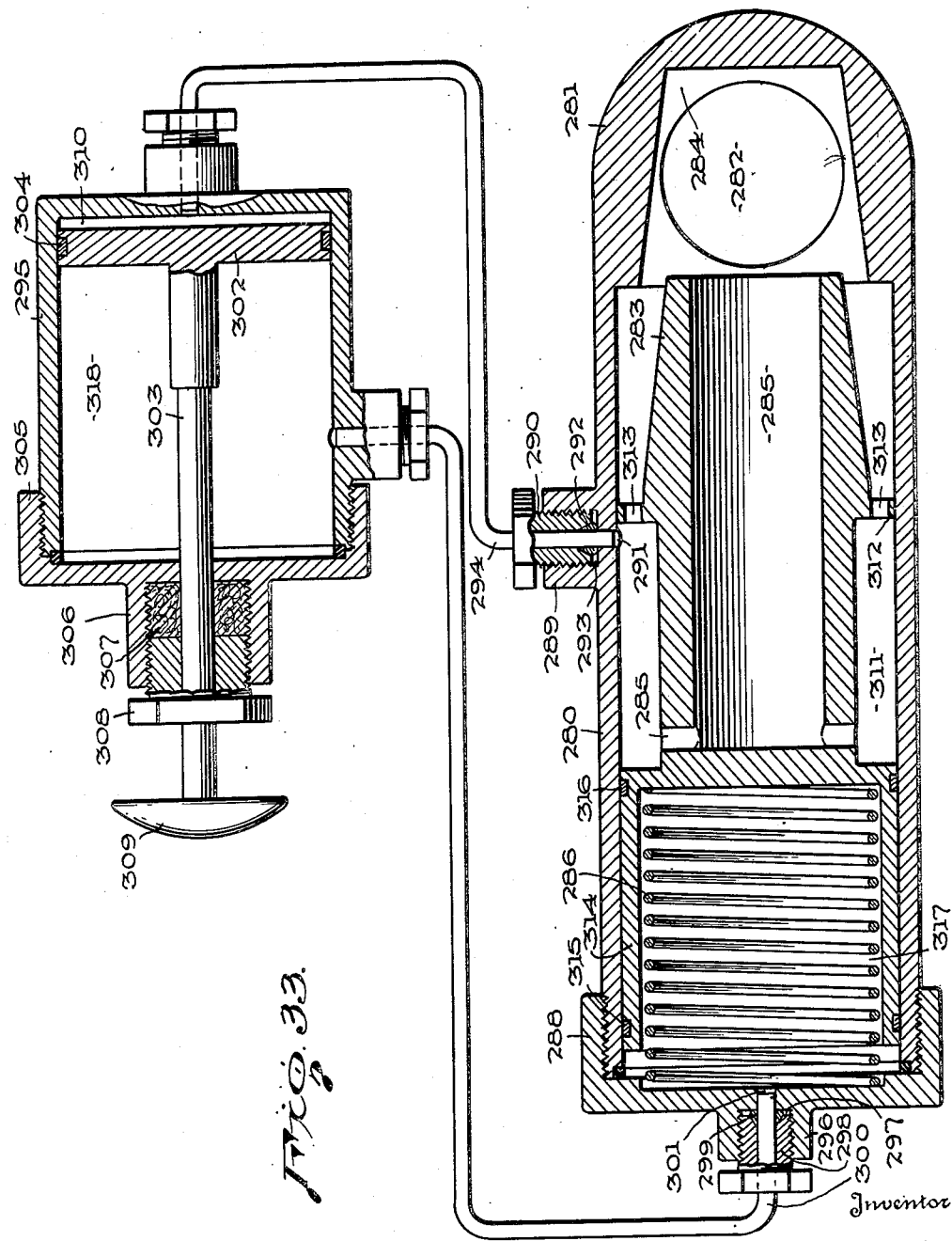

Patented Dec. 16, 1952

2,621,602

UNITED STATES PATENT OFFICE 2,621,602

HYDRAULIC POWER DRIVE

Cleburne Barnes Hatfield, Cookeville, Tenn., assignor of eighteen per cent to Mabel L. Poyner, Paris, Tenn., and seven per cent to Raymond N. Matson, Silver Spring, Md.

Application July 14, 1947, Serial No. 760,725

6 Claims. (Cl. 103—120)

This invention relates generally to power drives and more particularly to a variable-speed hydraulic power drive for automobiles, other vehicles, stationary machinery and other uses.

For convenience, the invention will be described as applied to an automotive vehicle although it will be understood that the invention has many and varied applications in power transmission.

In the past, a few automotive vehicles have been equipped with hydraulic power drives, but these vehicles were impractical and characterized by many serious disadvantages. Among these disadvantages was an excessive added weight resulting in unwieldiness and increased maintenance and operating costs, an extreme lack of flexibility in operation, a pronounced difficulty of control and manipulation, an added complexity of design and hence manufacture rather than simplification thereof, and an increase in initial cost and maintenance resulting in an extremely unfavorable competitive position in the automotive industry.

Accordingly, the chief object of the present invention is to provide a hydraulic power drive for automotive vehicles which will be entirely free of the disadvantages and objectionable characteristics described.

Another important object of the invention is to provide a completely automatic hydraulic variable-speed power drive which will completely, continuously and automatically adjust its own power ratio in accordance with constantly changing operating conditions such as load so as to eliminate gear shifting, clutch shifting or any attention to effect the adjustment.

Another important object of the invention is to provide a greater range of power transmission ratio which will permit the use of a smaller driving engine in present sized vehicles.

A further important object of the invention is to provide a variable-speed hydraulic drive for vehicles including an internal combustion engine, and a rotary type variable displacement pump, and a wheel motor wherein the pump is so constructed as to vary the liquid displaced per revolution of the engine in response to slight changes in torque on the engine crank shaft resulting from increased or decreased resistance to motion of the vehicle.

A further important object of the invention is to provide a variable displacement pump which is so constructed and arranged as to exert a uniform torque at all times on the shaft of the driving engine regardless of the speed in R. P. M. of the latter or the load imposed by the pump driven motor. Thus, in the case of an automobile engine wherein the speed in R. P. M. can be easily and quickly varied by the foot accelerator pedal, the same torque is automatically and constantly exerted on the engine drive shaft by the pump and motor regardless of engine speed variation or load variation occasioned by changes in resistance to motion of the vehicle.

A still further important object of the invention is to provide an automatic mechanism which will at all times automatically and constantly load the driving engine at the torque of maximum efficiency to thus prevent overloading and excessive wear and resulting damage and maintenance, and which will thus increase the mileage per gallon of the vehicle by making possible the use of a smaller and lighter driving engine.

Another important object of the invention is to provide an improved wheel structure and hydraulic motor for driving one or more wheels of a vehicle.

A further object of the invention is to provide an improved hydraulic drive for automobiles and other vehicles which will decrease their cost and maintenance by eliminating the present conventional clutch mechanism, the transmission gears, bearing and housing, the drive shaft, the differential gears and bearings, the rear axles and rear axle housing, and the front axles, thus lightening the weight of the vehicle and decreasing fuel consumption without decreasing the size of the vehicle.

Another object of the invention is to provide an inexpensive 4-wheel drive for vehicles, an independent free springing action for each wheel, and a smoother acceleration and deceleration resulting in greater ease and more efficiency in driving the vehicle through heavy traffic.

Another object of the invention is to provide a hydraulic power drive mechanism which may be thrown into reverse while moving forward at any speed so as to act as a brake without damage to the mechanism.

A further object of the invention is to provide a hydraulic power drive for vehicles which will eliminate the lubrication system present in conventional vehicles by being self-lubricating throughout.

A still further object of the invention is to provide a combined vehicle wheel and fluid motor assembly including a brake drum which is so arranged as to permit removal of any member of the assembly to permit ready access thereto or to the remaining member.

Another object of the present invention is to provide manual and automatic by-pass means for suspending driving action of the hydraulic pump as desired or as necessary in accordance with driving conditions encountered by the vehicle.

Other objects and advantages of the invention will become apparent during the course of the following description.

In the drawings I have shown one embodiment of my invention.

In these showings:

Fig. 1 is a plan view of the automatic variable speed hydraulic power drive installed on an automotive vehicle chassis;

Figs. 2, 2a and 2b taken together comprise a central longitudinal vertical sectional view of the variable displacement pump taken on the line 2—2 of Fig. 1;

Figs. 3, 3a and 3b taken together comprise a central longitudinal horizontal sectional view thereof taken at right angles to Figs. 2, 2a and 2b;

Fig. 5 is a vertical transverse sectional view of the variable displacement pump taken on the line 5—5 of Fig. 3a;

Fig. 6 is a vertical sectional view of the sliding gate of the pump taken on the line 6—6 of Fig. 3b;

Fig. 7 is a vertical sectional view of the sliding gate of the pump taken on the line 7—7 of Fig. 3a;

Fig. 10 is a plan view of the pump liquid displacement adjusting motor enclosed by the pump housing;

Fig. 11 is a transverse vertical sectional view of the pump liquid displacement adjusting motor taken on the line 11—11 of Fig. 2a;

Fig. 12 is a transverse vertical sectional view of the pump liquid displacement adjusting motor taken on the line 12—12 of Fig. 2a;

Fig. 13 is a vertical sectional view of the inlet and outlet valve system connecting with the pump liquid displacement adjusting motor taken on the line 13—13 of Fig. 10;

Fig. 14 is a view similar to Fig. 13 taken on the line 14—14 of Fig. 10;

Fig. 15 is a view similar to Fig. 14 taken on the line 15—15 of Fig. 10;

Fig. 16 is a view similar to Fig. 15 taken on the line 16—16 of Fig. 10;

Fig. 17 is a horizontal sectional view of the supporting guides of the displacement adjusting motor, taken on the line 17—17 of Fig. 3a;

Fig. 18 is a horizontal sectional view of a wheel motor;

Fig. 19 is a vertical sectional view thereof;

Fig. 20 is a vertical sectional view of the wheel motor taken on the line 20—20 of Fig. 18;

Fig. 21 is a vertical sectional view of the supporting guide rollers for the reciprocating gates of the wheel motor, taken on the line 21—21 of Fig. 18;

Fig. 30 is an end elevational view of the hydraulic reversing mechanism;

Fig. 32 is a vertical sectional view of the two-way pressure relief valves taken on the line 32—32 of Fig. 31;

Fig. 33 is a vertical sectional view of the hydraulic neutral valve taken on the line 33—33 of Fig. 1 combined with a vertical sectional view of the neutral valve hydraulic control in schematic relationship; and Fig. 34 is a horizontal sectional view through a typical Y pipe fitting and rubber hose connection, taken on the line 34—34 of Fig. 23.

In general and as applied to an automotive vehicle, the present invention comprises a hydraulic power drive including a variable displacement pump arranged to be driven by the engine of the vehicle; a plurality of wheel driving motors, each adapted to be driven by pressure fluid from the pump which is automatically variable in accordance with the load (highway grade, etc.) thereon; and means to effectively control the operation of the vehicle.

It is emphasized that in other applications of the present invention, the vehicle engine may have any type of power plant substituted therefor, and the energy transmitted from such power plant by the hydraulic power drive comprising the present invention, may be applied to stationary machinery of many different types such as hydraulic presses, hydraulically operated die casting machines and hydraulically operated machines for manufacturing plastics.

Referring to Figure 1 of the drawings, letter P designates the displacement pump assembly which is directly connected to the rear of the power plant or engine E in the position normally occupied by the conventional transmission which is eliminated in the present invention.

Figure 2B:
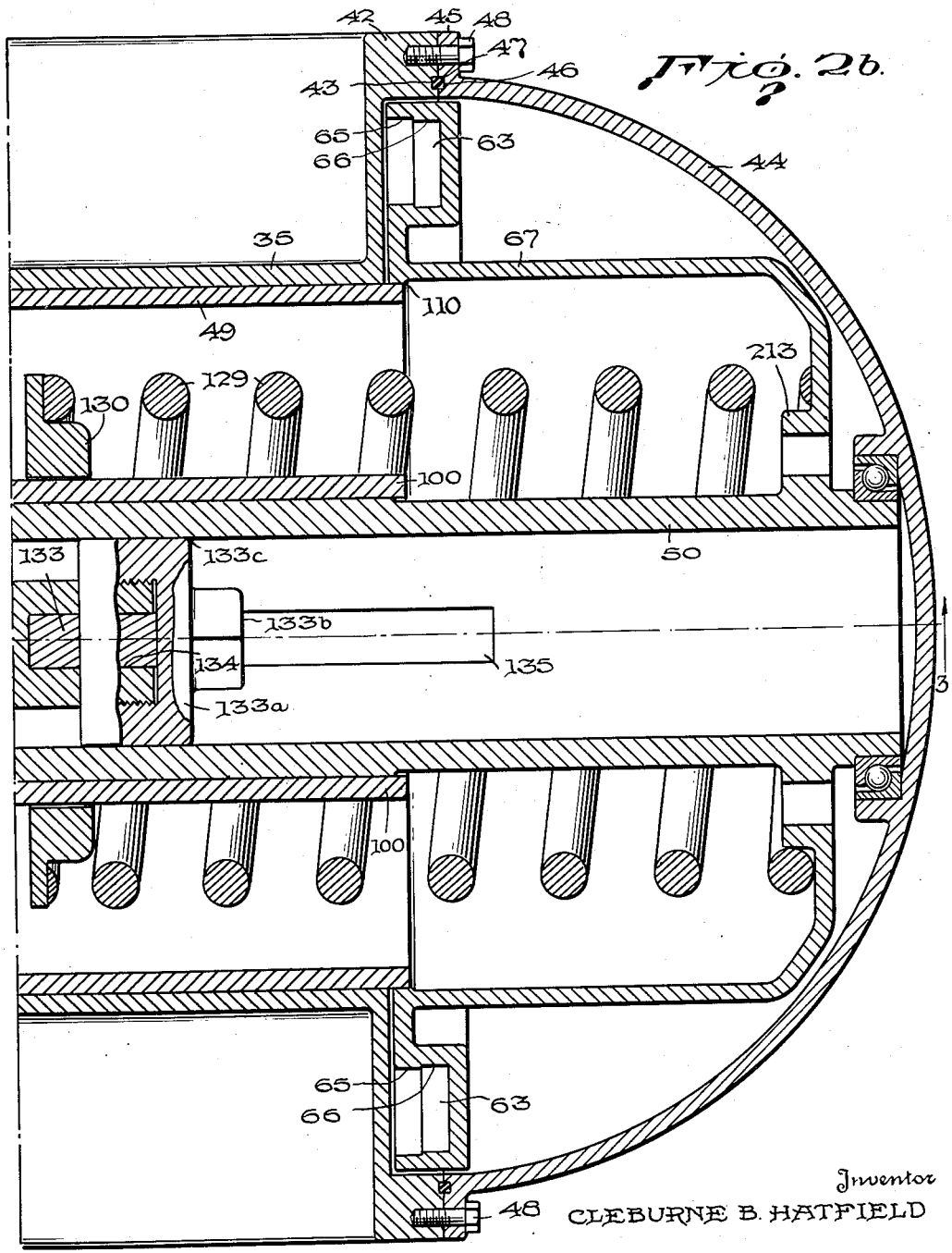

Referring to Figures 2 and 3, the endine drive shaft 1 has a splined driving connection with the socket 2 of a sun gear 3 which is rotatably mounted in a ball bearing 4 clamped to the gear shoulder 5 by means of a nut 7. The upper race of the bearing 4 is suitably fixed to the forward casing head 9 by a flanged cap 8. The casing head 9 has integrally mounted thereon a plurality of spindles 10 which rotatably support a plurality of planetary reduction gears 11 which are arcuately disposed 120° from each other and mesh with sun gear 3. An internally toothed ring gear 13 is rigidly supported upon the annular flange 14 of an inner rotatable shaft 15 and, looking from the left as in Fig. 2, as the drive shaft 1 rotates in a clockwise manner, the shaft 15 is caused to rotate in a counterclockwise manner.

Displacement pump casing

The pump casing 16 is completely filled with oil and sealed at its left end by the casing head 9 which is clamped thereto by the bolts 17. The abutting faces of the casing flange 20 and the head 9 are provided with opposing annular grooves 18 and 19 of rectangular cross section within which a gasket 21 of circular cross section is placed. The gasket 21 is slightly larger in cross section than the annular grooves so as to form a tight seal between the casing and head as well as to assist in aligning them when the parts are being assembled.

Leakage around the drive shaft 1 is similarly prevented by the provision of a pair of opposed annular grooves 23 and 24 formed in the abutting surfaces of the flanged cap 8 and the casing head 9 within which a gasket 25 is placed and compressed in sealing relationship by means of the securing bolts 22. A metallic bellows 26 is brazed to the interior of the flanged cap 8 and supports at its inner end a slip ring 28 of soft metal, felt, etc., which is received in an annular groove 29 of the nut 7 and tightly held therein by the pressure of a spring 30. This sealing arrangement insures that only a minute quantity of oil may escape thereby which quantity serves to lubricate the bottom surface of the groove 29.

The shaft 15 is rotatably supported at its left or forward end by a pair of thrust bearings 31 which are adjustably clamped between the shaft shoulder 33, an annular shoulder 32, and a retaining nut 34, the bearing 31 in turn being supported by a spider member 6 formed integrally with the outer pump casing 13. The forward pump casing 16 is secured to a central casing 35 by the bolts 36 acting through their respective annular flanges 37 and 38, the abutting faces of which are provided with opposed annular grooves 39 and 40 within which a sealing gasket 41 is clamped in a leak-proof manner as previously described. A rear casing 44 having an annular flange 45 is clamped to the rear flange 42 of the central casing 35 by means of bolts 43. The abutting faces of the flanges 42 and 45 are also provided with annular grooves 43 and 46 within which a gasket 47 is clamped in sealing relationship in a manner previously described. Thus the front casing 16, the central casing 35, and the rear casing 44 together with the forward casing head 9 form an oil-proof and leak-proof housing which encloses and supports in oil the various parts of the variable displacement pump being contained therewithin.

Displacement pump

Figure 4:
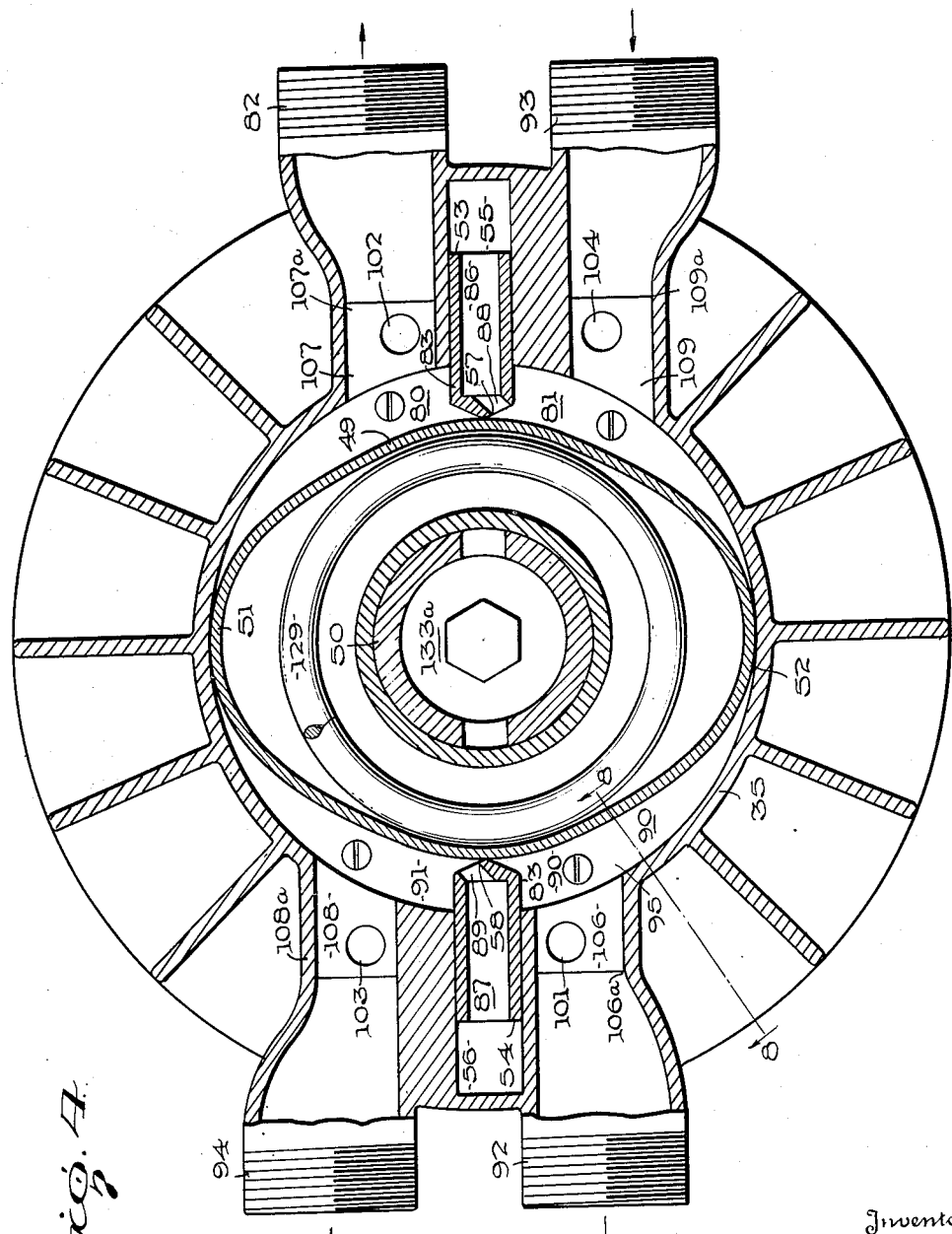
Fig. 4 is a transverse vertical sectional view of the variable displacement pump taken on the line 4—4 of Fig. 1.

Referring now to Figures 2, 3, 4, and 5, and particularly to Figure 4, the pump shaft 50 rotates in a clockwise manner. The symmetrical interior surface of the main housing 35 forms the outer wall of the annular chamber which is filled with oil to be pumped, the inner wall of this chamber being formed by the outer annular surface of the rotatable drum 49 which is also slidably mounted on the pump shaft 50 which latter action varies the amount of oil to be displaced per revolution of the pump as will be described.

The outer surface of the rotating drum 49 is formed so as to include a pair of opposed bulges, vanes, or cam sections 51 and 52 which engage the inner surface of the casing 35 with a very slight clearance. A pair of reciprocating gates 53 and 54 are mounted within a pair of sockets 55 and 56 formed in the inner periphery of the casing 35. The inner ends of gates 53 and 54 are tapered to form wear surfaces 57 and 58 and are maintained in engagement with the curved outer surface of the rotating and sliding drum 49. Each of the gates 53 and 54 is provided with ball bearing rollers 61 and 62 (Figs. 3a and 3b) mounted on axles 59 and 60 projecting from each end of the gates. The rollers 61 and 62 are received within a pair of opposed cam grooves 63 and 64 each of which includes a pair of ledges or tracks 65 and 66. The ledge 65 is formed on the inner curved side of the cam groove nearest to the center of rotation while the ledge or track 66 is formed on the outer curved side of the groove. The inner bearing rollers 61 engage the inner tracks 65 of the cam grooves 63 and 64 while the outer bearing rollers 62 engage the outer tracks 66. The two sets of rollers 61 and 62 are slightly spaced from each other by a washer and hence the two sets of ball bearing rollers 61 and 62 may roll independently and in opposite directions with respect to each other.

The right cam groove 63 is formed in the flanged sleeve 67 which is integral with the main shaft 50, and the left cam groove 64 is formed in the flanged sleeve 68 (Figures 2, 2a, 3, and 3a) which is splined to the left end of the shaft 50 as at 69, the splines terminating in a shoulder 71 against which the sleeve 68 is fixed by means of a nut 70. Thus the sleeves 67 and 68 with their cam grooves 63 and 64 respectively rotate as a unit with the shaft 50, the grooves rotating in opposed and exactly aligned position.

Referring now to Figures 6 and 7 which disclose the means for maintaining the gates 53 and 54 in true radial alignment while reciprocating under high pressure with a minimum of friction. The gates 53 and 54 reciprocate in identical rectangular sockets 55 and 56 having high pressure sides 72 and low pressure sides 73 so designed as to withstand the hydraulic pressure to which they are subjected. The sides 73 are of substantially greater thickness so as to operably mount the pressure resisting rollers 74 and 75 which are seated flush therewith by means of the circular sets of recesses 76 and 77. The rollers 74 and 75 are rotatably supported on spindles 78 and 79 which are threadedly secured in the sides 73 and the rollers bear against the edges of the rabbets 84 and 85 formed on the low pressure sides of the gates 53 and 54.

The sliding drum 49 rotates in a direction indicated by the arrow in Figure 6 and the chamber formed between the surface of the drum 49 between the cam portions 51 and 52 and the interior surface of the casing 35 is divided into sub-chambers 80 and 81 by the gate 53. Thus as the drum rotates the oil is compressed against the gate 53 and forced out through the outlet 82, the pressure on the side 83 of the gate 53 being resisted by the rollers 74 and 75 which also secure the gate 53 against edgewise motion as the edges of the rollers bear against the rabbet grooves 84 and 85.

It will be noted (Fig. 4) that the gates 53 and 54 are hollow with bores 86 and 87 connecting respectively with the low pressure chambers 81 and 91 by means of the passages 88 and 89. This structure avoids the entrapment of the oil behind the gates which are thus permitted to freely reciprocate in the sockets 55 and 56. It will be noted that when the gates slide outwardly, the oil from the sockets flows through the bores 86 and 87 and out through the passages 88 and 89 into the low pressure chambers and vice versa. Thus the gates may freely reciprocate radially and the oil on the high pressure side is maintained under compression with the oil under pressure being forced out of the annular oil pump passageway.

As seen in Figure 4, the drum 49 with its cam portions 51 and 52 divides the interior of the casing 35 into two portions or chambers which with the reciprocating gates 53 and 54 provide two symmetrical pumping areas or chambers. It will be readily apparent that as the drum 49 rotates in a clockwise manner, the sub-chambers 80 and 90 contain oil under high pressure while the sub-chambers 81 and 91 contain oil under low pressure. Further, as the drum 49 rotates the cam portions 51 and 52, the sub-chambers 80 and 90 containing oil under high pressure decreases in volume and the oil or the fluid under pressure is forced out through the pipes 82 and 92 respectively. Simultaneously the sub-chambers 81 and 91 are increasing in volume and the pressure fluid is drawn into these sub-chambers through the inlet pipes 93 and 94.

It will now be readily apparent that as the drum 49 rotates, pressure fluid is drawn into a pair of sub-chambers through the inlet pipes 93 and 94 and forced out of the other pair of sub-chambers through the outlet pipes 82 and 92 by the drum cam portions 51 and 52, and the two symmetrically disposed pumping chambers of the variable displacement pump P thus operate simultaneously, in exact symmetry, and the oil or pressure fluid flows continuously and smoothly through the system with positive compression.

Figure 8:
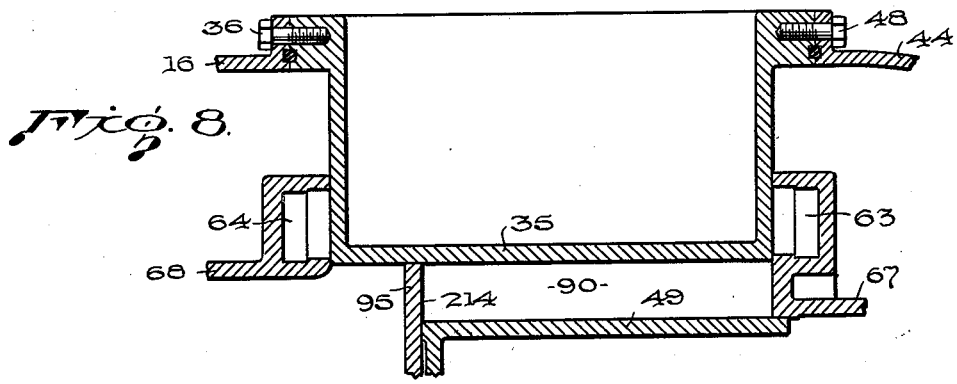
Fig. 8 is a fragmentary vertical sectional view of the annular pump chamber taken on the line 8—8 of Fig. 4.

The construction of the pumping chambers described is shown in detail in Figure 8. The walls of each chamber are formed by the inner cylindrical surface of the pump casing 35, the outer surface of the drum 49 between the cams 51 and 52, the flat inner surface of the flanged sleeve 67, and a sliding disc 95. The flanged sleeve 67 rotates with the drum 49 while the disc 95 slides with it but does not rotate, having mounted therein the spaced ball bearings 96 which are clamped against the shoulder 97 and an annular ring 98 by an adjustable securing nut 99, all being mounted between the flange of the disc 95 and the hub 100 of the drum 49. The sliding disc 95 is prevented from rotation by being fixed to the extended inlet and outlet pipes 101, 102, 103, and 104 by means of the screws 105. The four extended pipes have square end flanges 106, 107, 108, and 109 which are machined to fit with close tolerance in the four rectangular slideways 106a, 107a, 108a, and 109a respectively so as to prevent escape of the pressure fluid except through the inlet and outlet ports 101, 102, 103, and 104.

An important feature of the present invention resides in the cooperating action between the cams 51 and 52 and the cam grooves 63 and 64 which ensures that the reciprocating gates 53 and 54 are describing a simple harmonic motion resulting in a minimum of shock and a maximum of smoothness of operation. While the reciprocating gates are held against lateral motion by the socket sides 55 and 56, the actual bearing is taken up by the rollers 74, and 75 respectively which prevent any edgewise gate motion. All of the rollers engage with close tolerance and roll on their respective tracks so that (Fig. 3b) the outer rollers 62 turn in one direction while the inner rollers 61 rotate in the opposite direction, resulting in rolling friction but no sliding friction. The right and left spindles 59 and 60 being formed integrally with the gates 53 and 54 and operating through the rollers 62 and 61 maintain the inner ends of the gate with very close tolerance against the curved surface of the drum 49 so as to eliminate oil leakage and sliding friction. The shape of the two opposed cam grooves 63 and 64 is identical with each other and with that of the surface of the drum 49 so that during rotation of the shaft 50 the high points of the cams 51 and 52 and the cam grooves are simultaneously reached. Thus the reciprocating gates 53 and 54 are at all times held a uniform distance from and with close tolerance substantially against the surface of the drum 49 regardless of its angular position.

The displacement of the rotary pump is varied by sliding the drum 49 longitudinally by pressure exerted against the disc 95. As seen in Figures 2a, 2b, 3a, 3b, and 8, the position of the drum 49 and the disc 95 is at that of maximum displacement or the furtherest position to the left. As will be readily apparent, the displacement per revolution is directly proportional to the length of the rectangular area 90 (Fig. 8) which is determined by the longitudinal position of the drum 49 and its supported disc 95. As it slides longitudinally, the rotating drum 49 telescopes within the closely fitting flanged sleeve 67. The shoulder 110 of the flange 67 is machined to close tolerance with respect to the exterior of the drum 49 to effect a substantially oil tight joint on the right hand side of the pumping chamber.

*The pump displacement adjusting motor*

The drive shaft 1 of the engine E driving through the planetary reduction gears rotates the hollow inner shaft 15 which is journaled on the bearings 31 at its left end and at its right end by the enlarged portion 111 which fits the interior of the shaft 50 with close tolerance. When the various hydraulic forces are out of balance, as will be more fully described, the shaft 15 revolves independently of and faster or slower than the shaft 50 and when such forces are balanced, the two shafts rotate in unison.

The hollow shaft 15 rotatably supports the solid shaft 112 which has a pair of spiral cam grooves 113 and 114 of variable slope and rectangular cross section disposed 180° apart in its surface. Projecting within the cam grooves are a pair of roller bearing rollers 117 and 118 mounted on a pair of bolt screws 115 and 116 which are threadedly mounted on opposite sides of the shaft 15 in the grooves 113 and 114. The rollers 117 and 118 include inner annular projecting flanges 119 and 120 which support and hold in place a plurality of needle rollers, the other end of which bear against the shoulders 121 and 122 formed on the screws 115 and 116 respectively.

In order to minimize friction, narrow, shallow shoulders 123, 124, 125, and 126 are formed at the bottom corners of the cam grooves 113 and 114 respectively so that the inner flat surface of the rollers 117 and 118 are thereby supported adjacent their outer perimeter and bear, roll, or slide with only this narrow surface bearing against the flat inner sides of the rollers which are prevented from moving outwardly by the outer flanges 119 and 120 bearing against the square ends of the needle rollers. The outer-curved surfaces of the rollers are formed in the shape of truncated spheres, the radius of the curve being slightly less than that of the inner symmetrical surface of the shaft 15 to permit the rollers 117 and 118 to rotate on the needle rollers without rubbing or sliding friction.

Figure 9:
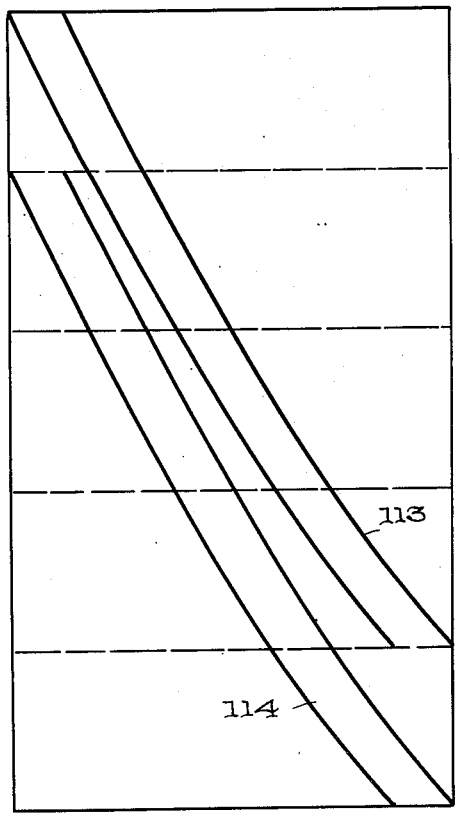
Fig. 9 is a development on a flat plane of the variable slope spiral cam grooves which compress the power ratio adjusting spring by cam action.
Figure 11:
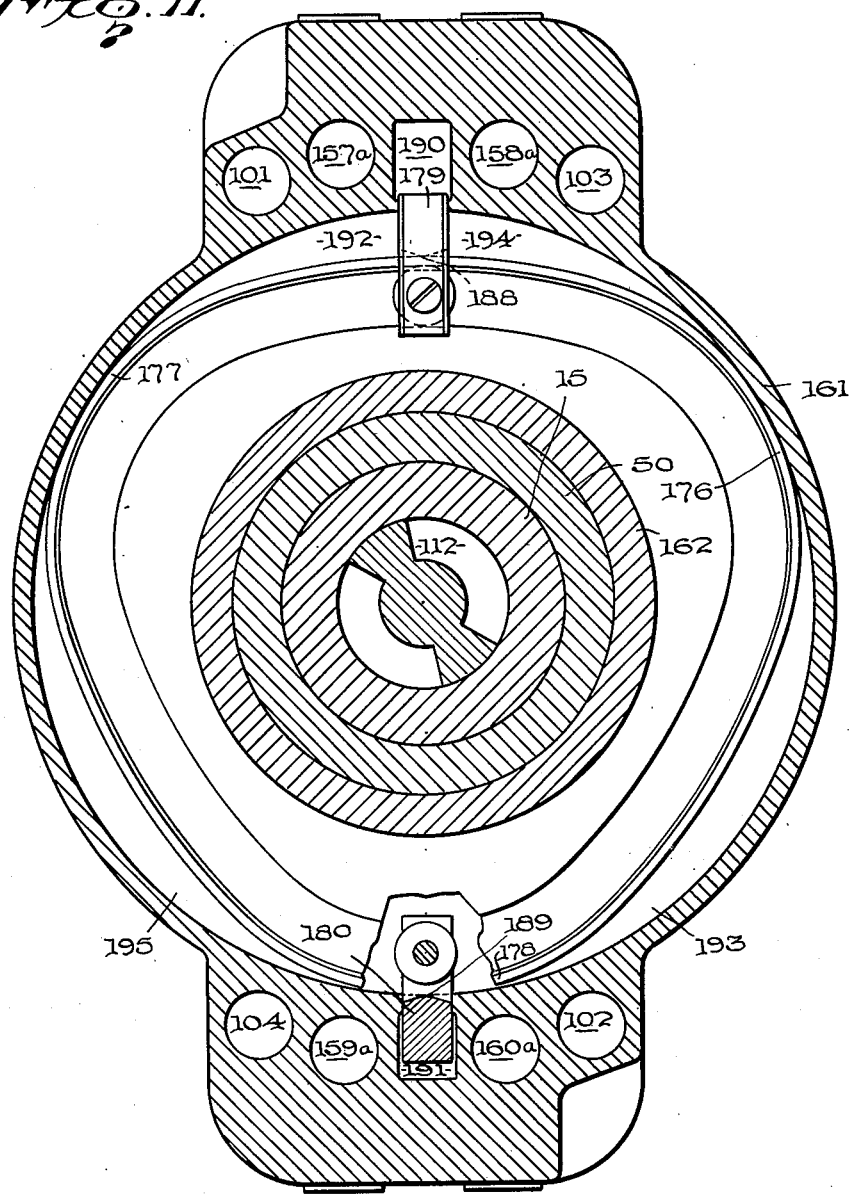
Figure 22:
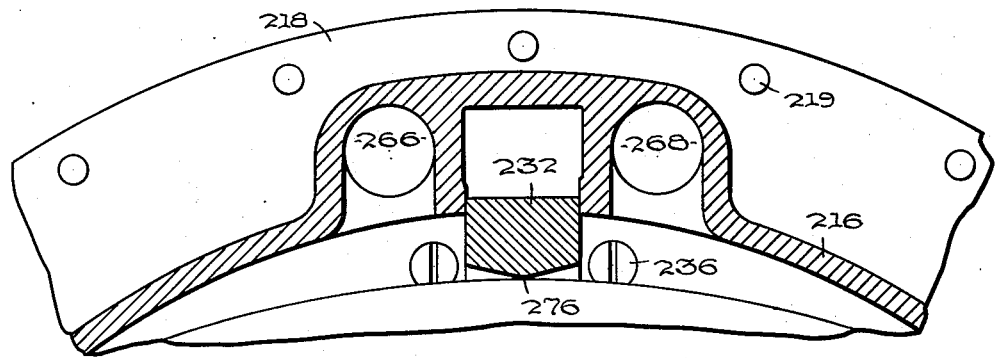
Fig. 22 is a vertical sectional view through the inlet and outlet pipe lines and rectangular socket for the reciprocating gate of the wheel motor, taken on the line 22—22 of Fig. 18.

Figure 9 discloses a plane development of the two variable slope cam grooves 113 and 114 which are disposed 180° apart on the surface of the shaft 112. The bearing rollers 117 and 118 will each support one-half the load resulting from torque exerted by the engine E on the shaft 15 as, being 180° apart each roller will have traveled an identical distance longitudinally through its spiral cam groove.

The slope of the spiral cam grooves is such as to provide a sufficient amount of metal between the groves to withstand all imposed strain. As seen in Figures 2a, 3a and 9 the amount of metal between the spiral grooves progressively diminishes toward the left due to the variable or decreasing slope of the spiral cams. The point of greatest slope is at the extreme right hand side at the position of the rollers 117 and 118 (Fig. 3a).

A strong compression spring 129 is disposed within the drum 49 and the flanged sleeve 67, bearing against the latter at one end and against a flanged ring 130 at its other end, the ring in turn being supported by the projecting ends 131 and 132 of a U-shaped key 133 fitted in a transverse slot 134 which is machined into the right hand end of the shaft 112. The key 133 is fixed to the end of the shaft 112 by a socket nut 133a having a hexagonal boss 133b and an exterior machined cylindrical surface 133c forming a journal bearing for the right end of the shaft 112. The ends 131 and 132 project through the longitudinal slots 135 and 136 formed in the shaft 50 and through the longitudinal slots 137 and 138 formed in the hub 100 of the drum 49. The key 133, in position in the slot 134 of the shaft 112, and the projection of the ends 131 and 132 through the slots 135, 136, 137, and 138 of the shaft 50 and the drum 49 respectively, serve to locate and lock the three members 112, 49, and 50 together for rotation in unison.

Thus when the drive shaft 1 of the engine rotates the shaft 15 through the reduction gears, the bolts screws 115 and 116 and their roller bearings 117 and 118 exert force against the inner or right hand side of the spiral cam grooves 113 and 114. As previously pointed out, the points of contact of the rollers with respect to the squared sides of the cam grooves 113 and 114 are the cylindrical surfaces of these rollers 117 and 118, and the latter may roll freely in either direction with negligible friction inasmuch as the entire pump is completely filled with oil or pressure fluid. During periods when the pump is not in use and no torque is being exerted on the shaft 15 by the engine E the key 133, the flanged ring 130 and the spring 129 are in the position shown in Figures 3a and 3b which permits the spring 129 to be assembled with the pump so as to have whatever initial compression which may be desired.

The key 133 comprises the forwardly extending legs 139 and 140 which terminate against the forward ends 141 and 142 of the slots 135 and 136 (when the motor E is exerting no torque on shaft 15) and include outwardly projecting portions 143 and 144 which are clamped between a flanged ring 145 and a ring 146 secured to the latter by screws 147. The inner race of a ball bearing 149 is similarly clamped between the rings 145 and 146. The outer race of the bearing is similarly clamped to a valve adjusting disc 151 by means of a ring 153.

Referring to Figures 3a, 5, 10, 11, 13 and 15 it will be seen that the valve adjusting disc 151 includes a pair of oppositely disposed projections 155 and 156 to which four valve adjusting rods 157, 158, 159, and 160 are secured. The valve adjusting rods slide freely but with close tolerance within four bores 157a, 158a, 159a, and 160a Fig. 11) formed in the main housing 161 of the liquid displacement adjusting motor and the inlet and outlet valves within the latter are operated by the sliding movement of the rods. The movement of the valve adjusting disc 151 to the right (Fig. 3a) and the accompanying sliding of the four valve adjusting rods therewith will so operate the inlet and outlet valves of the rotary type displacement adjusting motor as to cause the latter to rotate in one direction. When the disc 151 and the four valve adjusting rods slide to the left to again operate the inlet and outlet valves, the displacement adjusting motor is then rotated in the opposite direction.

The displacement adjusting motor 161 includes a rotating sleeve and wheel 162, the sleeve portion 163 extending toward the left or front of the pump and is journaled for rotation upon the shaft 50. The wheel 162 and its sleeve 163 are preferably of a metal dissimilar to the steel of the shaft 50, such as bronze or some similar alloy.

The outer side of the sleeve 163 includes exterior helical threads 164 of acme or square shape which mesh with similar threads 165 formed on the inner surface of a thrust sleeve 166 having an annular flange 167 formed on its left or front end to act as the middle race of a double acting thrust bearing. The thrust race 168 seats against the shoulder 169 on the shaft 50 and the thrust race 170 is threadedly secured to the shaft 50 to permit adjustment for wear.

The thrust race 168 resists thrust of the sleeve 166 in a rearward direction, the race 170 resists the thrust of the sleeve 160 in a leftward or forward direction so that the combination double acting thrust bearing permits the thrust sleeve 166 to resist thrust in both directions and remain stationary while the shaft 50 is rotating.

The displacement adjusting motor outer sleeve 174 and flange 172 (Figs. 2a, 3a, 10 and 12) is secured to the housing 161 by bolts 173 to complete the outer housing and the interior of the sleeve 174 is splined as at 176 to mesh with the splines 171 formed in the outer surface of the thrust sleeve 166. Thus the outer sleeve 174 and flange 172 may slide forwardly or rearwardly with respect to the sleeve 166 but the latter cannot slide since it is retained in position by the double acting thrust bearing described.

It will be noted that the sleeve 174 is bolted to the housing 161 which has fixed thereto the extended passageways or pipes 101, 102, 103 and 104 which terminate in the square flanges 106, 107, 108 and 109 at their outer ends. Since these square end flanges closely fit the slideways 106a, 107a, 108a and 109a which are formed in the stationary main housing 35, the main housing 161 of the adjusting motor cannot rotate. The outer sleeve 174 and flange 172 being bolted to the housing 161 is also prevented from rotation. The outer sleeve and flange 172 further encompasses the sleeve 166 and is splined thereto so as to prevent rotation of the thrust sleeve 166 which, as described, is fixed against longitudinal movement by the double acting thrust bearing.

Figure 5:
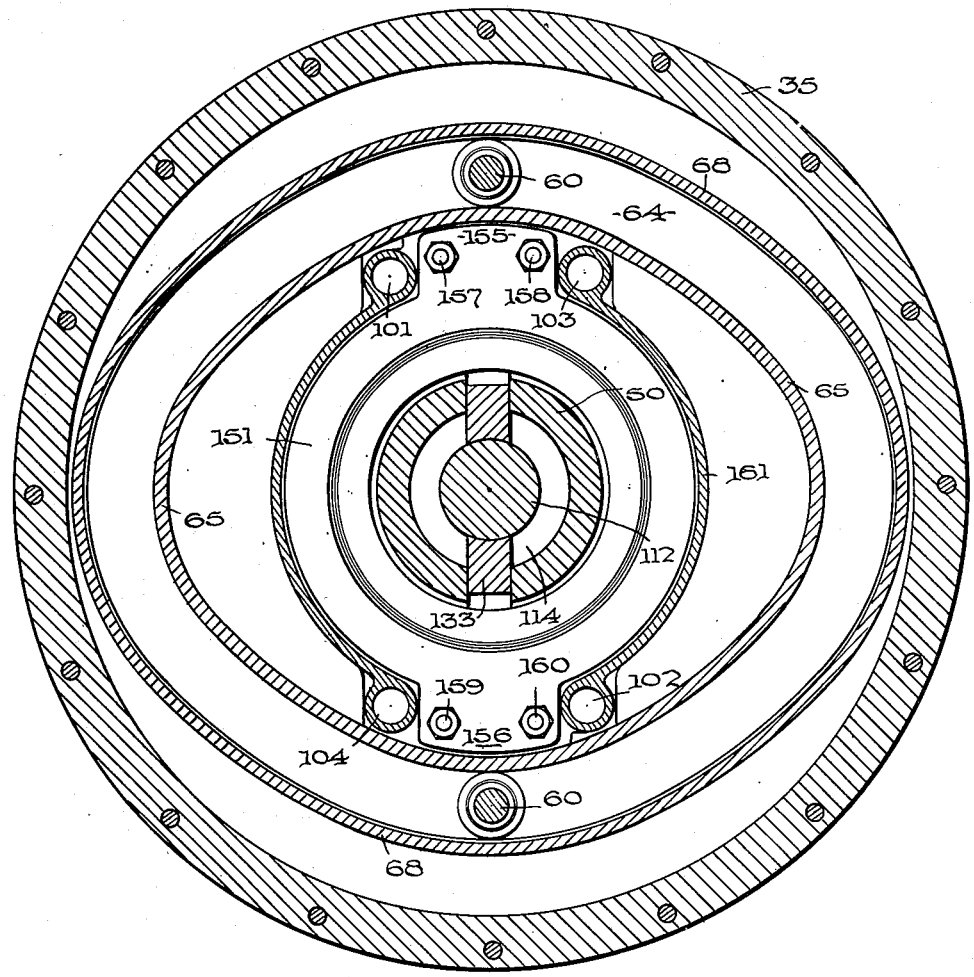

It will now be readily apparent that when the sleeve 163 and wheel or rotor 162 is caused to rotate in one direction or another by the adjustment of the valves, the forwardly extending sleeve 163 due to the helical threads 164 and 165 screws forwardly or rearwardly with respect to the sleeve 166 depending upon the direction of rotation. The action of the rotating sleeve and rotor 162 will be apparent from a consideration of the following. The oil pipes or passageways from the liquid displacement adjusting motor terminate in the ports of these pipes 101, 102, 103 and 104 in the square flanges 106, 107, 108 and 109 (Figs. 4 and 5). The ports of the pipes 101 and 102 are on the high pressure side of the gates 53 and 54 and serve as outlets from passageway 90 to the displacement adjusting motor. The other two openings 103 and 104 being on the low pressure sides of the gates, serve as inlets from the displacement adjusting motor to passageway 90.

The passageways are filled with oil at all times, but there is no flow therethrough except when the valves so permit. Thus when the valves are adjusted to prevent oil from flowing into the passageways 101 and 102 or through the liquid displacement adjusting motor, in and out of the liquid displacement adjusting motor, and back again through the passageways 103 and 104 to the low pressure side of the annular pump channel, all the oil (when the variable displacement pump is operating) must flow through the pump outlets 82 and 92 around through the fluid motor of each of the vehicle wheels and back through the rear line into the pump through the inlets 93 and 94.

When flow resistance through the outlets 82 and 92 is sufficiently great, the inlet openings 101 and 102 to the displacement adjustment motor and the outlet openings 103 and 104 therefrom are opened by valve action (to be described) to a greater or lesser degree and all or a portion of the oil which is being pumped by the rotor variable displacement pump will be by-passed through the variable displacement adjusting motor.

As shown in Figures 2a, 3a, 11 and 17, the pump wheel 162 is formed to include the three cam portions 176, 177 and 178 in its surface, angularly disposed 120° from each other and each acting in turn to reciprocate a pair of gates 179 and 180 each of which is U-shaped and straddles the outer circumference of the wheel 162. Each leg of the gates rotatably supports inner and outer rollers 181 and 182 upon a common axle 183 which is threadedly secured to each leg. The gates 179 and 180 are constrained against any but reciprocatory radial motion by the rollers 408 supported on axles 409 inserted through the housing 161 and the outer sleeve and flange 172 respectively in which they are threadedly secured. Eight rollers are provided for each of the gates which are disposed in opposing pairs with two pairs of rollers for each side of the gate. A rabbet or groove 410 is machined in the edge of the four corners of each gate and the rollers track in the bottom side of the grooves 410 and the roller sides bear against the edges of the rabbet, to thus permit easy sliding motion radially but prevent other motion. The gates 179 and 180 are received in the rectangular sockets 190 and 191 respectively during their reciprocation.

Cam grooves 184 and 185 are formed in the right and left sides (Fig. 3a) of the rotor 162 and tracks are formed in the grooves in a manner similar to that which operates the reciprocating gates of the pump. The tracks 186 and 187 are formed respectively on the inner and other sides of the cam grooves and the inner and outer rollers 181 and 182 respectively bear against the inner and outer tracks so that the inner and outer rollers rotate in opposite directions.

The oppositely disposed cam grooves 184 and 185 conform exactly to the cam portions 176, 177 and 178 of the wheel 162 which are so formed that the sides of the cam grooves acting through the inner and outer rollers to the axle 183 and the legs of the reciprocating gates 179 and 180, hold and support the gates so that their inner tips 188 and 189 are continuously held with very close tolerance substantially against the outer curved surface of the rotor 162. That is, the gates are raised or cammed radially outward to permit the cams to pass under the gates as the wheel 162 rotates. It will now be readily apparent that this rotary motor is symmetrically constructed with a pair of inlets and outlets and differs in principle from the pump only in that three cams are formed in the surface of the rotating wheel rather than two. Thus it is impossible for the rotary motor to come to rest in a position of dead center and hence it will start rotating upon the application of high pressure regardless of the angular position of the rotor 162.

The inlet pipes 101 and 102 connect their ports in the squared flanges 106 and 107 of Figure 4 with their ports in the casing 161 (Fig. 11) while the outlet pipes 103 and 104 connect their ports in the rotary motor with their ports in the squared flanges 108 and 109 (Fig. 4). The four valve adjusting rods 157, 158, 159 and 160 are slidably disposed in the cylindrical passages 157a, 158a, 159a and 160a, respectively.

Inasmuch as the two sides of the rotary motor including the valve system are similar and function identically, only the functioning of the inlet and outlet valves on one side need be described. Referring to Figures 10, 11, 13, 14, 15 and 16, it will be seen that the oil as it comes from the variable displacement pump (Fig. 4) is always under high pressure in the inlet pipes 101 and 102 (Fig. 11) regardless of whether the oil is flowing at the moment through the liquid displacement adjusting motor. Likewise, the oil in outlet pipes 103 and 104 of the liquid displacement adjusting motor is always under pressure. However, the valve system provided in the housing 161 of the liquid displacement adjusting motor is so constructed as to shunt the flow of high pressure oil to either side of the gates 179 and 180. Thus it is possible to cause the wheel 162 to rotate in a counter-clockwise direction (Fig. 11) by positioning the valve adjusting rods in a manner to be more fully described so that the sub-chambers 192 and 193 contain oil at high pressure and the sub-chambers 194 and 195 contain oil at very low pressure. Obviously, as the pressure in the foregoing areas is reversed, the wheel 162 would be forced to rotate in a clockwise manner.

The structure of the valve casing permits the reversal of the high pressure or inlet flow of oil and the low pressure or outlet flow from one side to the other side of the reciprocating gate by the valve adjusting rods, as will now be described.

The inlet or high pressure oil continuously enters the valve displacement adjusting motor through the port of the inlet pipe 101 (Fig. 11) while the low pressure or out flowing oil flows through the port of the outlet pipe 103. A portion of the valve adjusting rod 157 is of reduced diameter as at 196 and 197 and passages 198 and 203 are drilled through the casing and transversely through the passageway 157a, the outer ends of the ports being closed by threaded plugs 199 and 204 while the inner ends communicate with the sub-chamber 192. Similarly, the valve adjusting rod 158 is reduced in diameter as at 200 and a pair of passageways 201 and 205 are drilled through the passage 158a and through the casing, the passageways being closed at their outer ends by threaded plugs 202 and 206 and at their inner ends being in communication with the sub-chamber 194. The passageways 198, 201, 203 and 205 are of smaller diameter than the passageways 157a and 158a.

As seen in Figures 13, 14, 15 and 16, the valve adjusting rods 157 and 158 are in neutral position so that no oil may pass through either the inlet or outlet lines to and from the motor 161 and it cannot rotate. As previously described, the inlet or high pressure passageway 101 is at all times completely filled with oil and the rods 157 and 158 being larger in diameter than the passageways 198 and 201 respectively, close these passageways and no oil may enter the sub-chambers 192 or 194 on either side of the reciprocating gate 179 as long as the rods are in neutral position.

It will be readily apparent that being fixed to the disc 151, the valve adjusting rods 157 and 158 will move to the right when the disc is so moved. Such motion permits the reduced portion 196 of the rod 157 to open the passageway 198 to permit oil under pressure in the inlet passageway 101 to enter the sub-chamber 192 of the liquid displacement adjusting motor 161. Simultaneously the passage 205 is opened by the rod 158, the outlet passageway 103 is opened and oil is permitted to flow from the sub-chamber 194 through the passage 205 and the outlet passageway 103. Thus the motion of the rods 157 and 158 to the right (Figs. 13 and 14) connects the sub-chamber 192 with the high pressure inlet line 101 and the sub-chamber 194 with the low pressure line 103. Obviously the valve adjusting rods 160 and 159 respectively connect the high pressure inlet line 102 with the sub-chamber 193 and the low pressure inlet line 104 with the sub-chamber 195. When the four rods 157, 158, 159 and 160 are moved to the right (as viewed in Figures 13 and 14) the high pressure and low pressure oil lines are so valved and the high and low pressures in the liquid displacement adjusting motor are so arranged, the wheel 162 (Figs. 11 and 3a) is caused to rotate in a counter-clockwise direction, as viewed in Figure 11.

Upon rotation of the wheel 162 in a counter-clockwise direction, the integral sleeve 163 and wheel 162 screws itself out of the sleeve 166. The inner or right end of the outer housing of the liquid displacement adjusting motor 161 is supported on the bearings 207 and 208, the inner races being seated on the outer sleeve and flange 172 and the housing 161 which are bolted together. As a result, when the sleeve 163 screws itself out of the sleeve 166 to the right, acting through the bearings 207 and 208, it forces the adjusting motor to the right.

Since the valve adjusting rods 157, 158, 159 and 160 slide freely in their respective passages 157a, 158a, 159a and 160a and the rods are held and slidably moved independently of the displacement adjusting motor and housing, the rods may be stationary while the rotor 162 is rotating. If this is the case and the valve adjusting disc 151 and the rods have been previously moved to the right, the wheel 162 by the valve action of the rods will have been caused to rotate rapidly in a counter-clockwise direction as described. This rotation and its direction would tend to screw the rotor sleeve 163 out of the sleeve 166 and the entire adjusting motor assembly will be moved to the right until the rods are again in their neutral position, whereupon no oil can flow through the liquid displacement adjusting motor and the wheel 162 is motionless.

As the valve adjusting rods move to the left (Fig. 3a) the various valves operate so as to rotate the rotor 162 in a clockwise manner to screw the sleeve 163 into the sleeve 166 and move the entire adjusting motor assembly to the left until the rods attain their neutral position upon which rotation of wheel 162 ceases. That is, motion of the valve adjusting disc 151 and the four valve adjusting rods from a neutral position to either the right or the left operates the valves so that the rotor 162 and its sleeve 163 are caused to quickly and rapidly rotate in a corresponding direction so that the wheel 162 and its sleeve 163 immediately screw the entire liquid displacement adjusting motor assembly back to a position of neutrality with respect to the valve adjusting rods.

It will be noted that, as the rotor 162 and the adjusting motor housing 161 moves rapidly toward the neutral position with respect to the valve adjusting rods, the cross-sectional areas of the passages which are opened decrease rapidly from a maximum to a zero to effect a rapid deacceleration of the motion of the housing. Furthermore, when the neutral position of the rods is reached the passages are completely closed, preventing passage of oil, the rotor 162 is motionless and oil in the system functions as a dashpot to deaccelerate the wheel 162 to a complete stop without the use of braking mechanism. Obviously, when the wheel 162 is stationary the oil locks it in this position.

It will thus be readily apparent that when the wheel 162 rotates and screws the adjusting motor 161 in either direction, the sliding disc 95 moves therewith to also move the drum 49 through the bearings 96. Such motion of the drum 49 reduces the length of the rectangular chamber 90 and hence the capacity of the annular pump channel or passageway of the pump; that is, the displacement per revolution is varied.

The shaft 50 which directly or indirectly supports and holds in alignment the parts within the exterior housing of the variable displacement pump, is rotatably supported at its right end by the thrust bearing 209 fixed to the housing casing 44 and its left end is rotatably supported by the thrust bearing 211 mounted on the spider member 6 formed on the inner side of the main housing 16.

*Operation of the variable displacement pump*

It will be noted that the coil spring 129 bears against the key 133 through the ring 130 and that the ends 131 and 132 of the key project through the slots 137 and 138 in the drum 49 which slots are much shorter than the two slots 135 and 136 formed in the shaft 50. However, the ends 131 and 132 of the key may move in either direction within these slots 137 and 138 a distance equal to that through which the valve adjusting rods would move to completely open the inlet and outlet passages to the liquid adjusting pump, the position shown in Figures 3a and 3b being the mid-point of neutral position of the valve rods and the ends 131 and 132 of the key.

As stated, in neutral position the valves are closed, there is no flow of oil and the rotor 162 is hydraulically locked in a stationary position.

Thus, a slight movement to the right of the spring and key will result in movement to the right of the valve adjusting disc 151 and the four adjusting rods 157 to 160 will cause the inlet and outlet passages to the liquid displacement adjusting motor 161 to be opened to permit oil flow to rotate the rotor 162 (Fig. 11) in a counterclockwise direction. This results in the screwing to the right of the adjusting motor and the disc 95 until the neutral point of the valves and the midway point in the slots 137 and 138 is reached.

Such movement to the right narrows the width of the annular pump passageway (Fig. 8) or its cross sectional area to reduce the volume thereof, resulting in a reduction of the displacement or number of cubic inches of oil pumped per revolution. Obviously, the pumping of the oil under high pressure around an out of the annular pump disc 95 involves high pressure against its inner side 214. This pressure, however, is not exerted on and thus has no effect upon the spring supporting ring 130, the key, the disc 151 or the valve adjusting rods, but the pressure on the disc 95 is resisted by the four inlet and outlet pipes 101 to 104, inclusive, the liquid displacement adjusting motor housing, the thrust bearings 207 and 208, the wheel and sleeve 162 and 163, the sleeve 166, the double acting thrust bearings 168 and 170, and the shaft 50. Thus the forces acting to compress the spring 129 are independent of the variable oil pressure that is exerted on the inner side 214 of the sliding disc 95 forming the left side of the annular pumping channel.

The function of the coil spring 129 in varying the displacement of the pump will now be described. When the engine E drives the shaft 1 to rotate the shaft 15 through the planetary reduction gears, the rollers 117 and 118 bear against the right sides of the spiral cam grooves 113 and 114 respectively and tend to screw the spiral cam groove shaft rearwardly or to the right. The torque or the rotational forces exerted on the shaft 112 may be resolved into two component forces, one exerted perpendicular to the axis of rotation which tends to rotate the shaft and the other acting horizontally to the rear or toward the right so that if rotation of the shaft 112 actually occurs, it tends to screw the shaft rearwardly or to the right. Rotation of the shaft 112 rotates the key 133 to rotate the shaft 50, its right cam groove flange 67, the drum 49, and the left cam flange 68 so that the pumping cams 51 and 52 force oil around the annular pumping channel and out of the outlets 82 and 92. Furthermore, rotation of the spiral cam groove shaft 112 so as to screw it rearwardly, acts against the coil spring 129 which is assembled under strong initial compression. Thus, when the force required to rotate the shaft 112 and the shaft 50 and as a result pump oil is less than that required to compress the spring 129, the shaft 112 rotates to pump oil through the outlets 82 and 92 to the fluid motors mounted integrally on the vehicle wheels and then back into the pump inlets.

In the actual operation of a vehicle, if it is stationary, or being started, or if the slope of a hill is too great or increasing, or if deep mud or sand is encountered, the resistance of the vehicle wheels to turning may be sufficient to cause the force required to rotate the spiral cam shaft 112 to become greater than the resultant force required to compress the spring 129. Under such condition, the shaft 112 is screwed rearwardly or to the right, the spring 129 is compressed and the shaft 15 continues to rotate.

As previously described, however, compression of the spring and the resultant moving to the right thereof and its supporting ring 130, the key 133 and the valve adjusting disc 151 causes the inlet and outlet passages to the adjusting motor to be opened and all or a portion (depending on the extent of the opening) of the oil in the annular pumping chamber is by-passed through the liquid displacement adjusting motor by the passages 101 and 102 and back again into the annular pump chamber of the variable displacement pump through the passageways 103 and 104 (Fig. 4). The oil flow rotates the displacement adjusting motor so as to screw the rod assembly and housing back to neutral position. As previously described, this involves the sliding of the disc 95 and drum 49 to the right to reduce the length of the pumping chamber and decrease the number of cubic inches of oil pumped per revolution. Obviously this increases the number of revolutions of the automobile engine per revolution of the vehicle wheels to reduce the power or driving ratio.

The foregoing adjustment takes place very rapidly. During this process, since all or a part of the oil is by-passed to the liquid displacement adjusting motor, the shaft 15 which is directly connected to the engine drive shaft 1 through the planetary reduction gears continues to rotate at uniform speed unless the speed of the engine is accelerated. Thus a uniform torque load is continuously placed on the vehicle engine E.

The purpose of the variable or decreasing slope of the spiral cam grooves 113 and 114 will now be explained. In general, a plotted line of the torque of maximum efficiency of an internal combustion engine in relationship to its speed in revolutions per minute appears to be a straight line, but actually is a very flat curve within the maximum and minimum limits of the revolutions of the motor per minute, as used in ordinary driving. As a result, the desirable torque or torque of maximum efficiency may be considered constant during the ordinary range of driving speeds of a vehicle. The variable displacement pump is designed so that a uniform torque of maximum efficiency is at all times exerted by the driving engine E. Figure 9 illustrates the development on a flat plane of the two spiral cam grooves 113 and 114 where the initial position of the slope (the position of the rollers 117 and 118 in Fig. 3a) is the steepest position of the grooves. The slope at this initial point is just sufficient to balance the horizontal force component to the right due to rotation of the engine, with the force to the left exerted by the spring 129 so that the resultant of these two forces is zero. In this case, the other or rotational component exerted by the engine operates and rotates the variable displacement pump.

However, if the resistance of the wheels to turning increases, the rollers 117 and 118 will roll up the initial slope of the spiral cam grooves 113 and 114 and screw the shaft 112 rearwardly or to the right to compress the spring 129. Then as previously described, the disc 95 and the drum 49 will move to the right, the pump displacement per revolution will be decreased as will be the power ratio. As a result, the torque force component required to rotate the variable displacement pump will decrease and the opposing forces of the thrust to the right of the shaft 112 and the resistance toward the left of the spring 129 will be quickly brought back into balance.

It will now be readily apparent that the displacement per revolution of the pump may be rapidly adjusted downwardly so that the resultant of the various linear forces is zero. It will be seen that as a certain power ratio is necessary to climb a certain grade at a certain vehicle speed, the power ratio is maintained uniform during these conditions. As a result, for proper adjustment it becomes necessary for the disc 95 (Fig. 8) to be moved to the right to a certain point to adjust the displacement downward to a required amount and to remain at that point as long as the conditions of upward slope and forward vehicle speed remains constant.

However, the force required to compress the spring varies as the displacement. Accordingly, in order to exactly counteract the increasing leftward component of thrust of the spring as it is further compressed, the spiral cam grooves 113 and 114 constantly decrease in slope so that the torque of the shaft 15 and a tendency of the rollers 117 and 118 to roll up the slope of the grooves can continually be resolved into two resultant forces at any point in the slope in which the right and left force components will always be in balance.

Thus the displacement of the pump is continuously, automatically, rapidly, and smoothly adjusted or varied so that in propeling a vehicle forwardly or backwardly a torque load of maximum efficiency is continuously and uniformly placed on the vehicle engine E regardless of changing conditions of travel. It will be readily apparent that when the crest of a hill has been reached or when a vehicle emerges from deep sand or mud, the combination of conditions again changes so that a higher speed ratio may be used. In such case, the variable displacement pump automatically and smoothly adjusts itself back to that adjustment which will increase the displacement of the pump per revolution to thus increase the driving speed ratio.

*Vehicle wheel and fluid motor structure*

Reference will now be had to Figures 18, 19, 20, 21 and 22 of the drawings which disclose any one of the combined fluid motor and wheel units of the vehicle. The main housing of these rotary type hydraulic motors comprises an inner housing plate 215 and an outer housing plate 216 secured together by their annular flanges 217 and 218, the abutting faces of which are provided with annular grooves 220 and 221 of rectangular cross section within which a packing or gasket 222 of circular cross section and suitable material is placed to form a leak-proof and oil proof joint when the retaining screws 219 are tightened. A wheel or rotor 223 is rotatably mounted in the bearings 226 and 229 supported respectively by the annular flanges 228 and 231 of the housing sections 215 and 216.

A pair of U-shaped reciprocating gates 232 and 233 are oppositely disposed astride the rim of the rotor 223 and the legs of these gates include shallow rabbets 234 at each of their four corners. Bearing against the bottom and shallow edges of each rabbet are the gate guide rollers 235 supported by the axles 236 which are threadedly secured to the housing sections 215 and 216 as seen in Figure 18. Two of these rollers engage each rabbet and eight of these rollers are provided for each gate to prevent radial or edgewise movement and to permit easy radial movement into and out of the rectangular gate sockets 237 and 238. The outer periphery of the rotor 223 includes three cam or pressure portions 239, 240 and 241 each angularly spaced from the others by 120° and arranged to bear against and make close clearance with the inner surface of the flat outer cylindrical surface of the housing plate 216.

The hub 225 of the rotor 223 is drilled from its right end and provided with interior splines 242 to receive the external splines 243 of the brake drum 244 which is clamped in place by the flanged bolt 246, the left end of which has threaded engagement with the left end 224 of the hub 225 and is prevented from displacement by the screws 246 and 247 which themselves are prevented from rotation by suitable means such as a wire through the heads thereof. The interior surface of the flange 150 of the brake drum is machined to receive the pressure of a brake lining 248 supported by conventional brake shoe segments 249. A hydraulic brake-operating cylinder with its connecting tube (not shown) is operatively connected with the brake shoe 249 in a conventional manner.

A vehicle wheel 252 and tire receiving rim 253 is bolted to the brake drum disc 244 and a hub cap 256 having spring catches 257 closes a central annular opening 254a of the wheel. In order to prevent leakage of the pressure fluid or oil from the interior of the wheel motor, an annular plate 258 is clamped in a leak proof manner to the exterior of the housing 216 by the bolts 259 in a manner similar to that previously described. A metallic bellows 260 is attached to the plate 258 by brazing, etc. and its outer end is fixed to an annular bearing ring 261 of rectangular cross section which seats within an annular groove 264 in the inner face of a nut 262. A spring 265 urges the annular bearing ring 261 into the groove to prevent all but a negligible amount of oil leakage.

It will now be readily apparent that the construction and arrangement of the wheel motor, brake drum, and wheel permits the latter to be quickly and conveniently changed or removed to provide ready access to the brakes for adjustment and repair thereof. Moreover the wheel and the brake drum may be simultaneously removed to permit ready access to the wheel motor housing. It will be noted that the shaft 225 of the rotor 223 projects through the fluid motor housing on one side only, the load on the shaft being transmitted to the bearings 226 and 229.

The rotor of the wheel fluid motor rotates by oil pressure in a manner similiuar to that described in connection with the variable displacement adjusting motor and in either direction depending upon the direction of the oil being forced therethrough. As seen in Figure 20, the rotor 223 turns counter-clockwise when the vehicle is moving forward and conversely when the direction of oil is reversed in a manner to be described, the rotor 223 is rotated clockwise and the vehicle moves backwardly in reverse.

When the vehicle is moving in a forwardly direction and the motor wheel is turning in a counter-clockwise manner (Figs. 20 and 22), the oil passageways 266 and 267 act as inlets and the passageways 268 and 269 as outlets. The oil entering the passageways 266 into the sub-chamber 270 exerts pressure against the gate 232 and against the cam surface 241 while oil under pressure enters the passageway 267, acts against the gate 233 and the cam surface 239 to rotate the rotor 223 counter-clockwise. The oil entering through the passageway 266 exerts its pressure and flows out of the passage 269 while the oil entering the passage 267 exerts its pressure against cam 239 and flows out of the passage 268. Obviously, when the flow of the oil is reversed, the wheel 223 is rotated in a clockwise direction.

Outer and inner cam grooves 271 and 272 are formed in the lateral faces of the rotor 223 adjacent its outer periphery, each of the grooves including a pair of tracks upon which the rollers 273 and 274 roll in opposite directions. Each of the roller pairs 273 and 274 is supported by an axle 275 which is threadedly secured in the leg of the U-shaped reciprocating gate. The cam grooves and rollers continuously support the inner ends 276 of the gates so that a very minute clearance is at all times maintained between the inner gate ends and the outer curved cam surfaces of the surface of the rotor 223. It will thus be readily apparent that as the cams 239, 240 and 241 approach the gates 232 and 233, the latter will be cammed upwardly to ride over the cams while a minute clearance is maintained between the cams and the gates.

Hydraulic system and controls neutral by-pass valve

During the operation of the variable displacement pump, the oil under pressure is pumped out of the outlets 82 and 92 to the vehicle wheel fluid motors and back to the variable displacement pump P through the inlets 93 and 94 (Figs. 1 and 4). The outlets 82 and 92 are connected to their outlet pipe by union nuts and are joined by brazing or other suitable means to a Y fitting 276 which is secured to the hydraulic control unit C by the union nut 277. Similarly, the rear lines 93 and 94 are secured to the Y fitting 278 which is secured to the hydraulic unit C by the union nut 279.

The hydraulic control unit C includes a neutral by-pass valve 280 (Fig. 33) which, when open, provides a direct and unobstructed by-pass for the oil being pumped by the variable displacement pump P so that the engine E which is directly connected to the pump by the drive shaft 1, may thus idle without moving the car forwardly or rearwardly. Moreover, when the neutral by-pass valve is open, the engine starter may easily rotate the motor as the oil will then offer little resistance thereto.

The neutral by-pass valve 280 comprises a housing being closed at one end as at 281 but including lateral ports 282 through which the by-passed fluid flows at right angles to the cut-off hollow valve plug 283, which is conical in shape and slightly larger in diameter than that of the ports 282. Thus, when the valve plunger 283 is seated in its seat 284, the ports 282 are closed in a leak and pressure-proof manner. The bore 285 of the valve plunger acts to prevent the entrapment of oil in the end of the seat 284 to cause a buffing action.

A spring 286 is seated against the opposite end of the valve plunger and against a cover cap 288 to urge the plunger 283 into the seat 284. The valve housing 280 includes an internally threaded boss which receives the screw plug 290 within which is maintained the end of an oil line 294 which communicates with the port 291. The housing is made leak-proof by a washer 292 which is tightly compressed between the inner end of the plug 290 and the bottom of the cup 293 of the boss 289. The line 294 extends to the end of a hydraulic control cylinder 295 to which it is also connected in the leak-proof manner just described. The cover cap 288 also has a cylindrical boss 296 formed therein which includes a threaded port 297 in which a plug 298 compresses a washer 299 and the oil line 300 which is inserted into the aperture 301 is thus made leak-proof. The connection of the oil line 300 with the cylindrical boss in the side of the hydraulic control cylinder 295 is also made leak-proof in the manner just described.

The piston rod 303 is formed integrally with a piston 302 having a leak-proof ring 304. The piston rod 303 extends through a cover cap 305 which is threadedly secured to the cylinder 295 and includes an internally threaded cylindrical boss 306 containing therein a suitable packing 307 which is compressed by a packing gland 308. A control knob 309 is fixed to the end of the piston rod 303 and when moved inwardly forces the oil to the right of the piston through the oil line 294 into the chamber 311 which forces the plunger 283 to the left against the compression of the spring 286 to open the ports 282.

It will be noted that the annular bearing ring 312 which is formed integral with the plunger 283 is provided with ports 313 to permit free passage of the oil thereby and the outer socket portion 314 of the plunger acts as a piston, being provided with rings 315 and 316. During the foregoing, the oil to the left of the piston 314 escapes through the oil line 300 into the chamber 318 to the left of the piston 302 in the control cylinder 295. When the control handle is returned to the left, the oil flow and action just described is reversed and the neutral by-pass valve plunger 283 is seated to close the ports 282. It will be readily apparent that the control knob 309 may be placed on the dashboard of a vehicle or controlled by a left-foot pedal on the floor thereof to be operated in the same manner as the conventional clutch pedal.

Pressure operated by-pass valves

A pair of pressure operated by-pass valves 281 and 319 are also provided for the hydraulic system, these valves being identical in construction and disclosed by the single figure 32. One of these valves is located adjacent the entrance of the oil to the hydraulic reversing mechanism to be subsequently described, the other valve being placed adjacent the outlet of the oil from the reversing mechanism.

Each pressure by-pass valve comprises a main housing 281 or 319 which is a part of the main housing of the hydraulic control unit C. During forward movement of the vehicle, the passageways 320 and 321 are normally the outlet and inlet passageways respectively. A disc type piston 322 is mounted centrally of the casing and its right end shank projects within the socket 325 of a piston member 333 which is resiliently urged against an annular shoulder 326 adjacent the port 344 by means of a compression spring 328 acting at its other end against a threaded cap 331 of the casing 319, leakage between the two being prevented by means of the gasket 332. The port 327 is provided at the bottom of the socket 325 and ports 335 are provided in the face of the piston 333 to prevent buffing action upon sliding movement of the shank of the piston 322. Similarly, the left shank 347 is received in the socket 341 of the piston 336 which is urged against an annular shoulder adjacent the port 346 by a compression spring 337 acting at its other end against the threaded cap 338. The passages 342 in the case of the piston 336 and the passage 339 in the bottom of the socket 341 also prevent a buffing action during reciprocation of the shaft 347.

The double acting pressure by-pass valves function as follows. The oil in the line 320 has free passage to the chamber 343 through the port passage to the chamber 343 through the port 344. If the pressure in the line 320, and as a result the pressure in chamber 343, becomes greater than the force exerted by the initial compression of the spring 337, the piston 322 is forced to the left to permit oil to escape around the annular opening into the chamber 345 up through the port 346 and into the passage 321 and the oil is thus by-passed. As this occurs, the piston 336 slides to the left, the spring 337 is compressed and the right piston shank 324 slides partially out of the socket 325. Since the socket 325 is longer than the distance the piston can slide before striking the end of the housing, the end of the shank 324 is retained in the socket 325. The piston 333 remains stationary because of the annular seat 326.

As the pressure in the passageway 321 becomes greater than the initial compression of the spring 328, the piston 322 and the rods 324 and 347 in an action similar to that just described, slides to the right and the oil escapes from the chamber 345 to the chamber 343 up to the port 344 and out the passageway 320.

Hydraulic fluid reversing mechanism

The disposition and arrangement of the conduits and various parts of the hydraulic fluid reversing mechanism is disclosed in Figures 1, 27 through 31 inclusive of the drawings. The hydraulic reversing mechanism comprises a drum including a forwardly disposed casing 281 secured to a rearwardly disposed casing 319 by the bolts 348 in a leak-proof manner by means of packing placed within annular mating grooves 349 and 351 formed respectively in the flanges 350 and 352 of the casings 281 and 3'9. The drum 353 is disclosed in horizontal cross section in Figure 27 in its normal position within the reversing mechanism housing, the forward disc 354 and the rearward disc 356 fitting respectively with close tolerance against the annular machined seats 355 and 357 in the front and rear casings 281 and 319.

Figure 29:
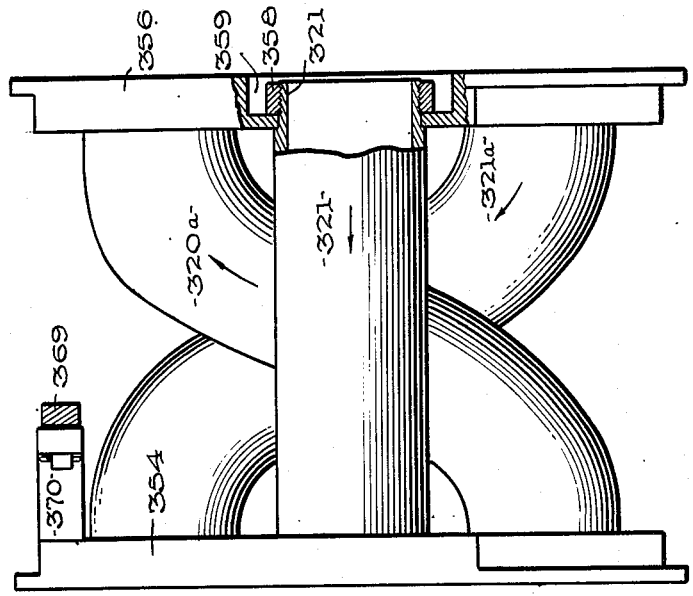
Fig. 29 is a side elevational view of the hydraulic reversing drum.
Figure 28:
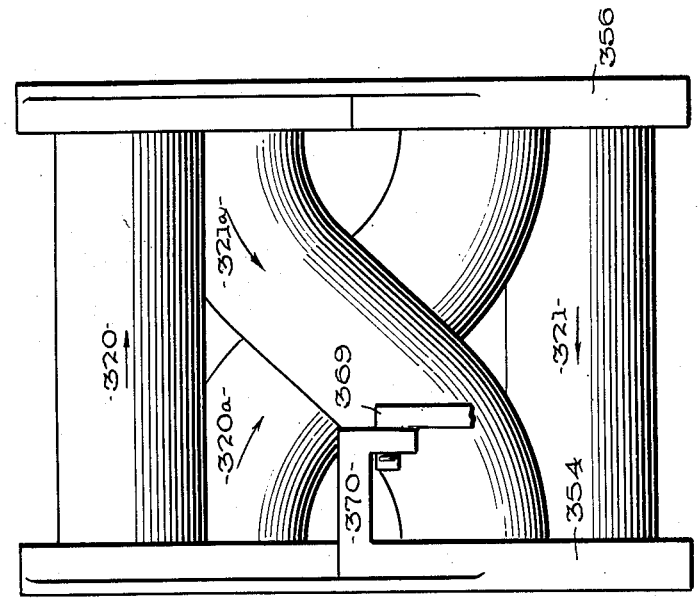
Fig. 28 is a top plan view of the hydraulic reversing drum.
Figure 31:
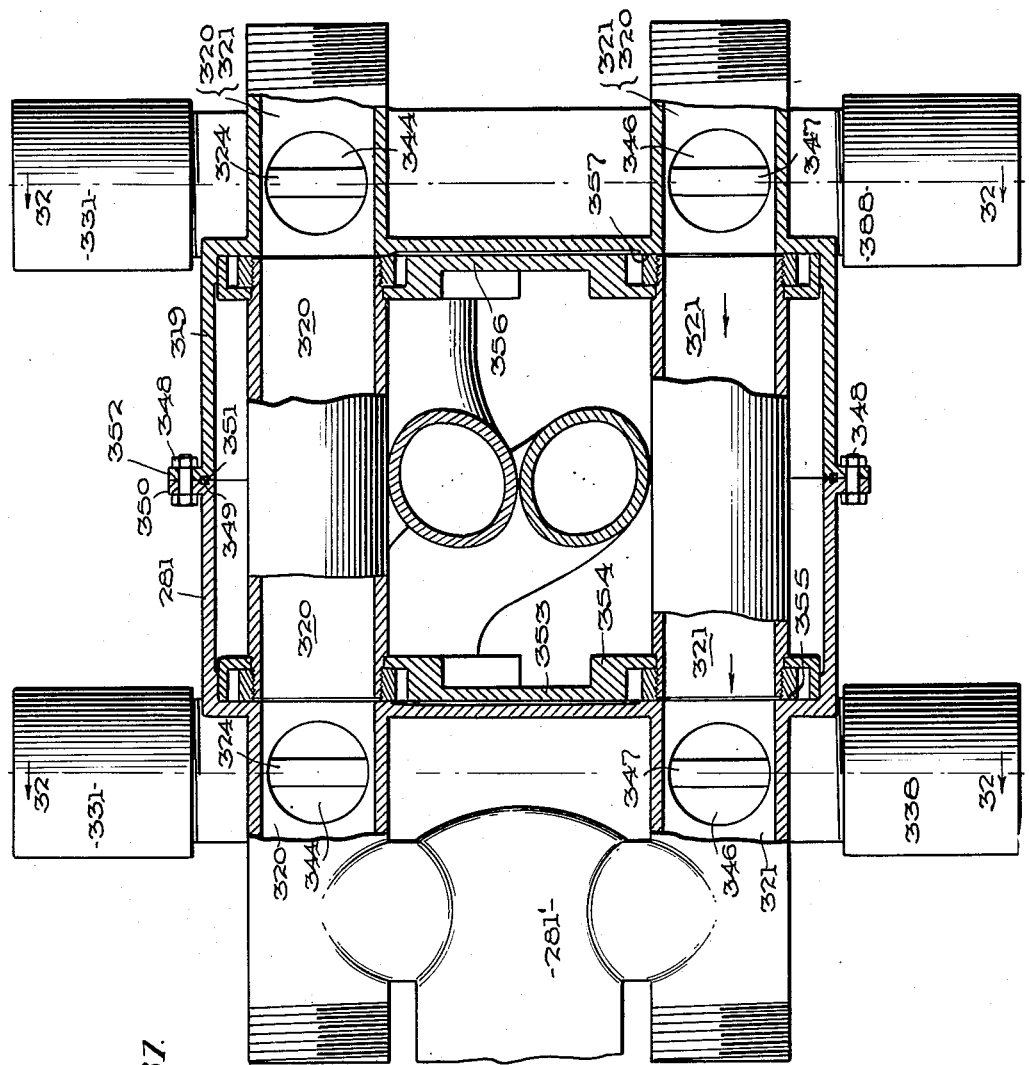
Fig. 31 is a central horizontal sectional view of the hydraulic reversing mechanism.

During forward movement of the vehicle, oil is forced by the pump to pass through the passages 320 to the vehicle wheel fluid motors and back along the rear passage 321 to the pump. However, the reversing drum 353 is also provided with a pair of other pipes 320a and 321a disposed in "pigtail" fashion with respect to each other (Figs. 28 to 30, inclusive). It will be noted that when the reversing drum is rotated in its housing from the normal position shown in a clockwise manner through a small radius, the passage 320 in the forward part of the housing is connected by the pipe 321a to the passageway 321 in the rear of the housing. Similarly, the passageway 321 in the front of the housing is connected by the "pigtail" pipe segment 320a with the passageway 320 in the rear of the housing. Accordingly, although the oil in the conduits leading from the variable displacement pump P to the hydraulic reversing drum 353 continues to flow in the same direction, the oil in the conduits from the reversing drum to the vehicle wheel fluid motors is flowing in a reversed direction.

As in the case of the other various elements of the present invention, the interior of the hydraulic reversing drum is filled with oil. Accordingly, when the direction of the oil to the wheel motors is reversed, the direction of rotation of the wheel motor rotors 223 is reversed and the vehicle moves backwardly instead of forwardly. The hydraulic reversing drum includes a plurality of shoulders formed near the ends of the four pipe segments to bear against the end plates or discs 354 and 356, the ends of the pipes are inserted through properly disposed apertures, and the ends thereof are secured by nuts 358.

In order to rotate the reversing drum the required distance to align the pipes 320a and 321a respectively with the forward passageways 321 and 320, (Fig. 27) is threadedly secured to a boss 361 projecting from the forward casing 281. A guide sleeve 364 is mounted within and clamped against the boss 361 by means of its annular flange by the shoulder 362 of the cylinder 360. A spring 365 is seated against the head of the cylinder 360 and acts against a piston 366 to maintain it seated against the sleeve 364, the piston rod 367 passing through a guide aperture 368 and being connected with a linkage rod 369 in turn pivotally connected to a stud 370 formed integrally with the forward disc 354. As shown, the piston 366 is in its normal position and the straight conduit segments 320 and 321 in the drum are in alignment with the outlet 320 and inlet 321 to the variable displacement pump so that the vehicle will move forwardly during operation of the pump.

The piston of the power cylinder 360 is activated by a control cylinder 373 connected to the former by the oil conduits 371 and 374 which are suitably packed against leakage and in the respective bosses forming the connections. A piston 376 is in normal at-rest position within the cylinder 373 when a shouldered portion 377 of the piston rod 378 abuts the end cap 379 which is suitably secured to the cylinder. The outer end of the piston rod 378 is of reduced diameter and projects through the packing 383 of the cap 379 to have a sliding connection with a slot in an actuating control or reversing lever 384 which is located conveniently to the driver of the vehicle.

It will be readily apparent that actuation of the lever 384 forces the oil contained in the chamber 385 through the oil conduit 374 into the reversing drum which being already full of incompressible oil, the piston 366 is moved to the left against the spring 365 to rotate the hydraulic reversing drum counter-clockwise and throw the vehicle into reverse. This rotation is easily accomplished in view of the oil filled interior of the housing, the annular shoulder 389 of the cylinder 360 acting as a stop when the "pigtail" conduit segments 320a and 321a are in exact alignment with the respective passageways 321 and 320 at the forward housing 281. It will be noted that the oil to the left of the piston 366 is forced out of the cylinder 360 through the conduit 371 into the chamber 387 to the left of the piston 376 in the cylinder 373.

An important feature of the present invention resides in the fact that the novel construction of the two-way pressure operated by-pass valves and the reversing mechanism enables the reversing lever to be actuated and the vehicle thrown into reverse while moving forwardly at high speed without any damage to the hydraulic drive mechanism. In such case, the oil in the vehicle wheel motors and the pipe conduits leading thereto from the reversing mechanism would continue to flow temporarily in the normal direction for forward vehicle travel due to the inertia of the car which rotates the wheel motor rotors 223 in a counter-clockwise direction. The rotation of the reversing drum in the reverse position results in meeting of the column of oil in the conduit 321 which is being driven or pumped by the vehicle wheel motors due to the vehicle momentum with the oil now being driven in the reversed direction and results in actuation of the piston 322 of the pressure operated by-pass valve 281 to by-pass the oil. The pressure also is sufficiently great to operate the pressure operated by-pass valve 319 to the left to by-pass the oil.

However, the force required to compress the spring 337 and 328 of these pressure operated by-pass valves acts as a powerful brake on the oil flow and hence on the forward speed of the vehicle to rapidly decelerate it to a dead stop whereupon the vehicle immediately begins to move and accelerate in the reverse direction. Accordingly, the reversing mechanism may not only be so operated without damage, but may be used as a brake to quickly stop the vehicle. Moreover, this method of braking could be used exclusively to eliminate the conventional brakes using friction linings or the latter could be used merely as emergency brakes. In the use of the hydraulic reversing mechanism as a braking system, a brake pedal would be substituted for the lever 384.

Vehicle chassis

Figure 23:
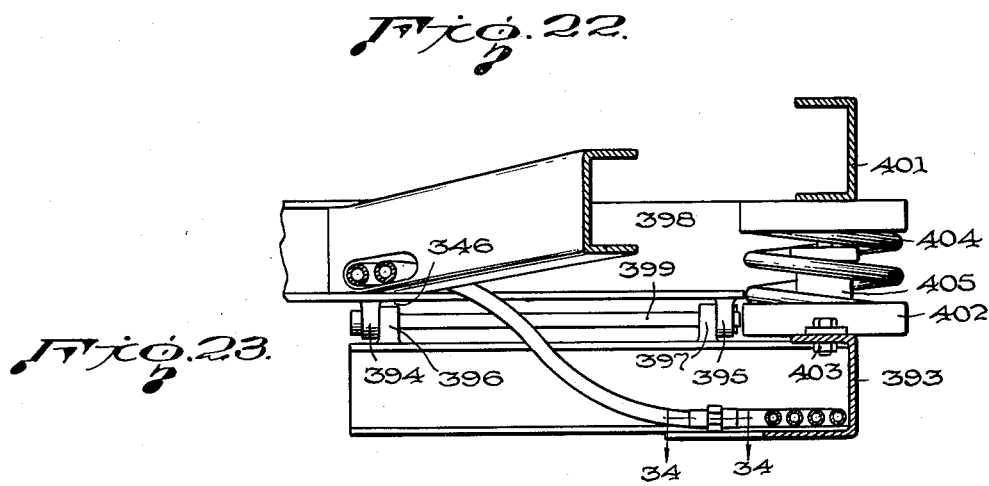
Fig. 23 is a vertical sectional view of the pin hinge points of a rear wheel supporting elbow and coil spring, taken on the line 23—23 of Fig. 1.
Figure 24:
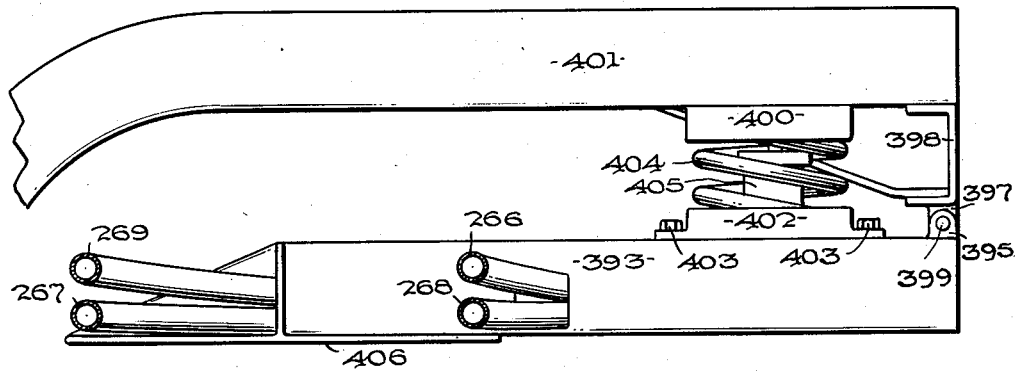
Fig. 24 is a fragmentary detail vertical elevational view thereof, taken on the line 24—24 of Fig. 1.
Figure 25:
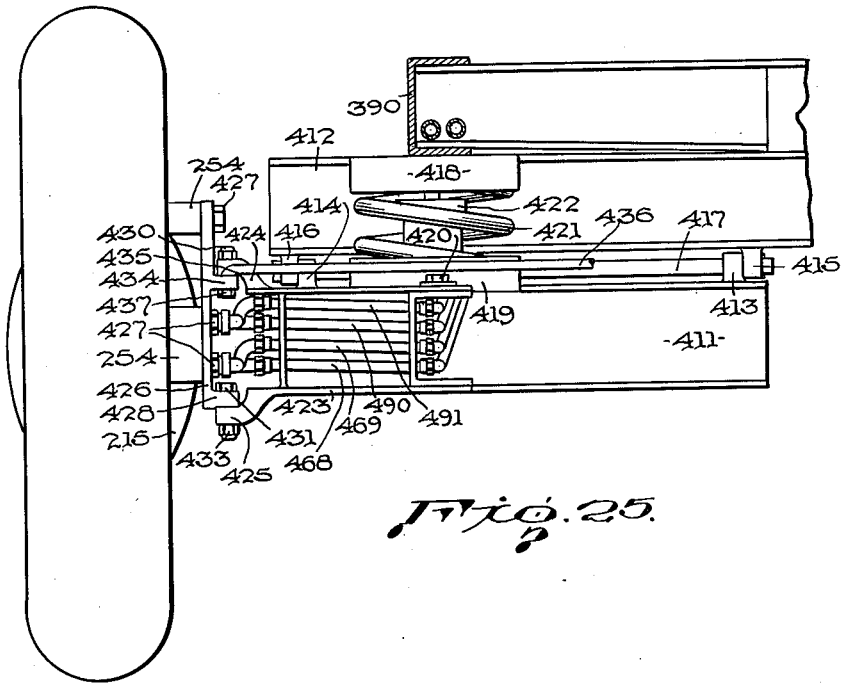
Fig. 25 is a vertical sectional view of a front wheel supporting elbow, coil spring, buffer, and pivot joints showing the connecting hose, taken on the line 25—25 of Fig. 1.
Figure 26:
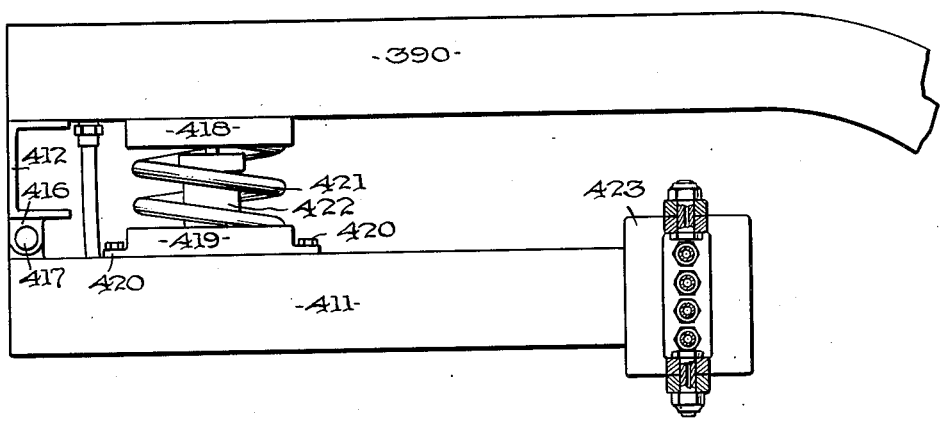
Fig. 26 is a detail elevational view of a front wheel supporting elbow and coil spring, taken on the line 26—26 of Fig. 1.
Figure 27:
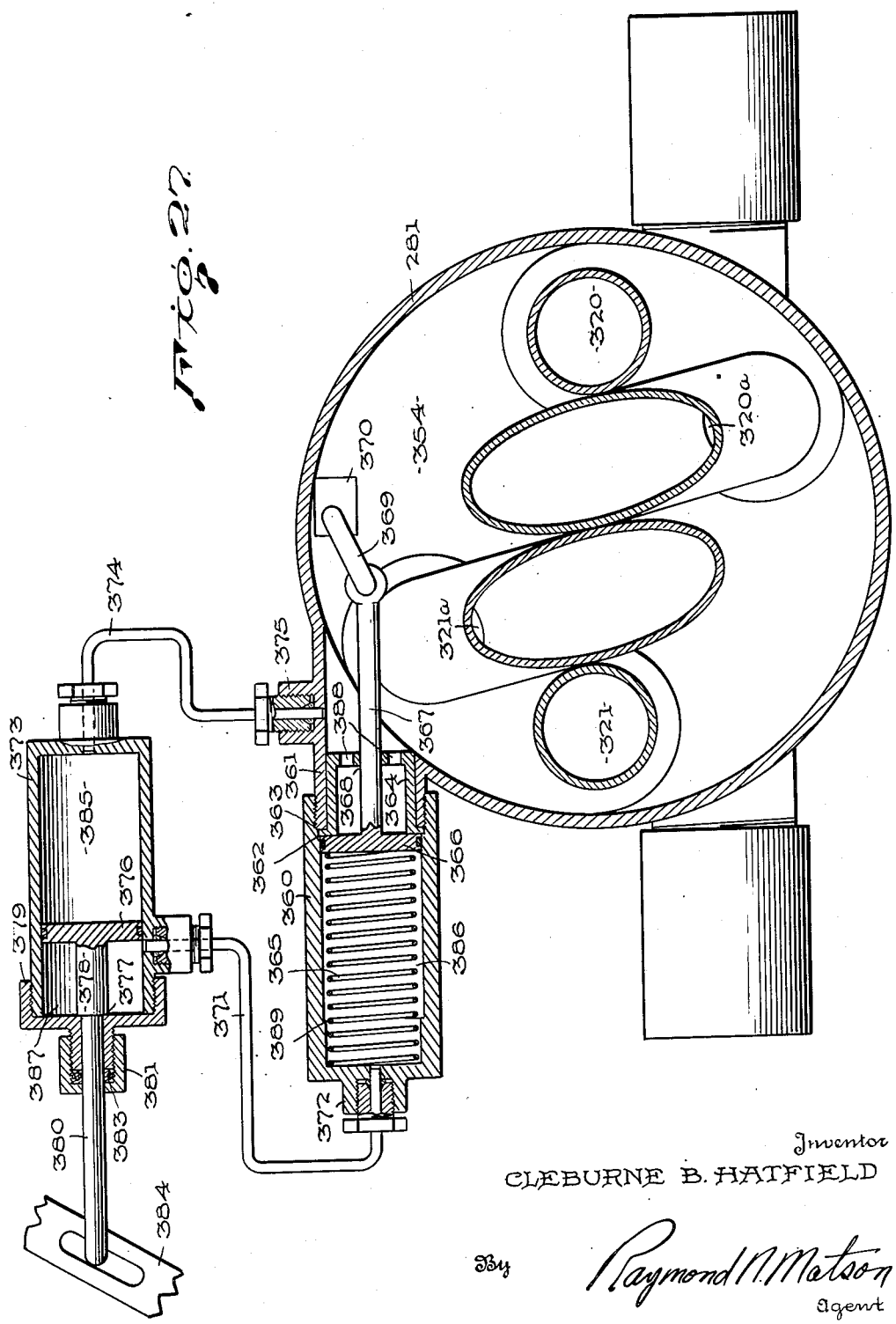
Fig. 27 is a transverse vertical sectional view of the hydraulic reverse mechanism, taken on the line 27—27 of Fig. 1.

The engine E is suitably supported between the two longitudinal chassis frame members 390 and 401 and the variable displacement pump is secured to the rear of the engine by means of an annular flange as at 392. The remainder of the mechanism; that is, the other end of the pump and the control mechanism are suitably supported and cushioned in the frame. Referring to Figures 1, 23 and 24, it will be seen that a transverse channel member 393 connects the frame members 390 and 401 at the rear of the chassis and is provided with downwardly projecting apertured bosses 394 and 395 which cooperate and align with a pair of upwardly projecting apertured bosses 396 and 397 fixed to a L-shaped frame member 393 which is pivotally secured to the frame 398 by means of a hinge pin 399 projecting through the aligned bosses so as to permit the L-shaped frame section 393 to swing with respect to the channel frame 398.

A spring cup 400 is welded to the frame 401 in opposed relationship to a similar spring cup 402 fixed to the frame 393 and both support and seat the ends of the coil spring 404 to thus give spring suspension to the rear wheel. A hydraulic buffer 405 of any conventional type may be disposed within the coil spring and fixed to the frame members 401 and 393 by means of the cups to provide the buffing action during flexing of the spring. A T-shaped plate 406 is fixed by welding to the auxiliary frame 393 and the inner housing plate 215 of the vehicle wheel motor is suitably bolted to the T-shaped plate. The foregoing description of the frame structure is of one side of the rear frame, the other side being identical and need not be described.

The mounting of the wheels at the front end of the chassis is generally similar to that described for the rear wheels. An auxiliary frame 411 is pivotally connected to the diagonal frame member 412 by a hinge pin 417 inserted through the aligned apertures of the bosses 413, 414, 415 and 416 which are respectively integral with the frame 415 and the main lateral frame 412.

An upper spring seating cup 418 is fixed, as by welding, to the lower surface of the main frame member 401 and a lower spring cup 419 is secured to the upper surface of the auxiliary frame 411 by the bolts 420 to support between them a coil spring 421 to give spring suspension to the front wheel. The main spring is, of course, fixed at its ends to the spring seating cups and a hydraulic buffer 422 of any suitable type may be disposed within the spring and fixed to the frames 401 and 411 at its ends in order to provide buffer action during spring flexure.

Inasmuch as the front wheels of the vehicle must be pivotally mounted for steering purposes, a Y-shaped member 423 is fixed to the auxiliary frame 411 and projects outwardly to terminate in upper and lower projecting lugs 424 and 425. A flanged plate 426 secured to the wheel motor inner casing 215 by the studs 254 and nuts 427 and the plate 426 is provided with a pair of inwardly projecting bosses 428 and 429 which are aligned with and pivotally connected to the lugs 424 and 425 of the member 423 by means of the pivot pins 430 and 431 which are retained in place by the nuts 432 and 433 respectively. An apertured lug 434 projects inwardly from the plate 426 and to the rear of its center and receives the end 435 of the steering rod 436 which is secured thereto by the nut 437. Inasmuch as both front wheels are secured pivotally and steerably to the front end of the chassis in the same manner, it will be unnecessary to describe the mounting of the front wheel on the opposite side of the chassis.

Pressure fluid distribution system

The conduits of the oil distribution system of the hydraulic power drive comprising the present invention as mounted on the vehicle chassis involve a number of connections between the various metallic and rubber conduit sections. Such a connection or joint is disclosed in Figure 34 in which a Y fitting connects a pair of metallic conduits to a rubber hose. Obviously, the same principle may be applied where a single hose is connected to a single metallic conduit. The metallic conduits 438 and 439 are secured by welding, brazing or other suitable means, to the Y fitting 440, the end 441 of which is tapered for insertion into the end of a rubber hose 442. A coupling collar 443 which includes an inner conical or tapered passage 444 is threadedly secured to the Y fitting 440. It will be noted that when the collar is threaded on to the Y fitting that the end of the rubber hose 442 will be compressed between the Y fitting portion 441 and the tapered portion of the collar 443 to form an oil tight joint.

The oil from the variable displacement pump P passes through the outlet pipes 82 and 92 which are joined by brazing, etc., to the Y fitting 276 which is secured to the inlet passageway 320 of the hydraulic control unit C by a coupling nut. The oil then flows alongside and through the by-pass pressure valve and into the hydraulic reversing drum which, in forward motion, permits the oil to pass straight to the rear through the outlet 329 and into the divided fitting 445a in which four high pressure conduits are connected. The conduits 446 and 446a conduct pressure oil to the rear wheels while the conduits 447 and 447a conduct pressure oil to the front wheels. In passing through the rear wheels, the oil passes through the pipe fittings 448 and 448a through the rubber hose segments 449 and 449a to the two wide pipe fittings 450 and 450a respectively and divide the oil into the smaller conduits 451, 451a, 452 and 452a respectively (Fig. 1). The conduits 451 and 451a constitute the inlets to the wheel motor on the left rear wheels and the conduits 452 and 452a constitute the inlets to the wheel motor on the right rear wheel.

After passing through each vehicle wheel motor to rotate the same in the manner described, the oil is discharged from the wheel motors by the conduits 453, 453a, 454 and 454a. The former are joined to enter the rubber hose sections 457 by the Y fitting 455 while the latter are joined to enter the hose 458 by the Y fitting 456. The hoses 457 and 458 pass through the fittings 459 and 461 to enter respectively the conduits 466 and 462.

The several rubber hose sections 457, 458, 449 and 449a are provided in the distribution system in order that the rear auxiliary frame member 393 may swing on the pivot pins 399 when the rear springs 404 are compressed. The fittings 448, 448a, 459 and 461 which secure the inner ends of the rubber hose are fixed in stationary position while their outer ends are respectively attached to the Y fittings 450, 450a, 455 and 456 respectively which are fixed to the auxiliary frame 393.

The oil to the front wheels flows through the two conduits 447 and 447a, the former leading to the left front wheel and including a pipe fitting, a rubber segment, and a Y fitting to the two pipe conduits leading to the two conduits 468 and 469 which connect by rubber hoses to the inlet ports of the left front wheel motor. On leaving the vehicle wheel motor, the oil again flows through the rubber hose segments 490 and 491 which permit the front wheels to be steered and back to the fitting 445 by means of various connections, rubber and metallic conduits. The oil to the right front wheel flows through the conduit 447a after leaving the divided fitting 445a and follows a path similarly arranged to the oil path to the left front wheel. Upon returning to the fitting 445, the oil passes straight forward (if the vehicle is in forward motion) through the pipe 321, through the hydraulic reversing mechanism, and out through the forward pipe end 321 to the Y fitting 278 and through the conduits 93 and 94 to the variable displacement pump P.

It will be noted that the four rubber hose segments leading to each of the front wheel fluid motors permits the front wheels to be steered while the rubber hose segments adjacent each of the coil springs 404 and 421 of the chassis permit free spring action of their adjacent wheel.

In the foregoing disclosure, the term "forward" is to be understood as meaning in a direction toward the forward end of the vehicle and vice versa.

It is to be understood that the various forms of my invention herewith shown and described are to be taken as preferred examples of the same and that various changes in the shape, size and arrangement of parts may be resorted to without departure from the spirit of the invention or the scope of the subjoined claims.

I claim:

1. A fluid pump comprising a casing, a pump rotor cooperating with a portion of said casing to form with a pair of side walls a pair of pumping chambers therewith, the surface of said rotor including a plurality of cam portions, a pair of reciprocable gates mounted in said casing and dividing said chambers into expansible sub-chambers, inlet and outlet fluid passages communicating with said sub-chambers, a pair of opposed tracks formed in said side walls and rotatable with said rotor and conforming in curvature to the surfaces thereof, and a plurality of rollers mounted on said gates for rolling contact with said tracks whereby said gates are held closely adjacent but spaced from the surface of said rotor to minimize friction and leakage therebetween.

2. A fluid pump comprising a casing, a pump rotor cooperating with a portion of said casing to form with a pair of side walls a pair of pumping chambers therewith, the surface of said rotor including a plurality of cam portions, a pair of reciprocable gates mounted in said casing and dividing said chambers into expansible sub-chambers, inlet and outlet fluid passages communicating with said sub-chambers, a pair of opposed tracks formed in said side walls and rotatable with said rotor and conforming in curvature to the surfaces thereof, a plurality of rollers mounted on said gates for rolling contact with said tracks whereby said gates are held closely adjacent but spaced from the surface of said rotor to minimize friction and leakage therebetween, and a second set of rollers mounted in said casing and bearing against the low pressure side of said gates to constrain them against all but radial motion.

3. A fluid pump comprising a casing, a tube journalled therein, a drive shaft extending into said casing and journalled in said tube, a pump rotor slidably mounted on said tube and cooperating with a portion of said casing to form with a pair of side walls a plurality of pumping chambers therewith, the surface of said rotor including a plurality of cam portions, a plurality of reciprocable gates mounted in said casing and dividing said chambers into high and low pressure chambers, fluid inlet and outlet passages communicating with said chambers, one of said side walls being movable to vary the displacement of said pump chambers in accordance with changes in the torque load on said drive shaft and means coupling said drive shaft and said rotor and operative upon a variation in torque load on said shaft to actuate additional means to move said movable side wall and vary the capacity of said chambers to re-establish the predetermined torque load upon said drive shaft.

4. A fluid pump comprising a casing, a tube journalled therein, a drive shaft extending into said casing and journalled in said tube, a pump rotor slidably mounted on said tube and cooperating with a portion of said casing to form with a pair of side walls a plurality of pumping chambers therewith, the surface of said rotor including a plurality of cam portions, a plurality of reciprocable gates mounted in said casing and dividing said chambers into high and low pressure chambers, fluid inlet and outlet passages communicating with said chambers, one of said side walls being movable to vary the displacement of said pump chambers in accordance with changes in the torque load on said drive shaft, and means coupling said drive shaft and said rotor and operative upon a variation in torque load on said shaft to actuate additional means to move said movable side wall and vary the capacity of said chambers to re-establish the predetermined torque load upon said drive shaft, said coupling means comprising a helically grooved shaft journalled in said drive shaft, rollers mounted on said drive shaft and projecting into said grooved shaft to effect a rotation and axial movement thereof upon deviation of drive shaft torque from a predetermined amount, a key fixed to said grooved shaft and coupling said rotor thereto, and resilient means having a predetermined force acting against said key to prevent relative rotation of said drive shaft and said grooved shaft at a predetermined torque load thereon.

5. A fluid pump comprising a casing, a tube journalled therein, a drive shaft extending into said casing and journalled in said tube, a pump rotor slidably mounted on said tube and cooperating with a portion of said casing to form with a pair of side walls a plurality of pumping chambers therewith, the surface of said rotor including a plurality of cam portions, a plurality of reciprocable gates mounted in said casing and dividing said chambers into high and low pressure chambers, fluid inlet and outlet passages communicating with said chambers, one of said side walls being movable to vary the displacement of said pump chambers in accordance with changes in the torque load on said drive shaft, and means coupling said drive shaft and said rotor and operative upon a variation in torque load on said shaft to actuate additional means to move said movable side wall and vary the capacity of said chambers to re-establish the predetermined torque load upon said drive shaft, said additional means comprising a fluid adjusting motor mounted on said tube and having a rigid connection with said movable side wall, a valve plate mounted about said tube and adapted to be axially moved by said coupling means, a plurality of valves fixed to said plate and adapted to control fluid flow to the rotor of said adjusting motor, said rotor being constructed and arranged to effect axial movement of said adjusting motor upon rotation of the rotor in response to fluid pressure admitted by said valves.

6. A fluid pump comprising a casing, a tube journalled therein, a drive shaft extending into said casing and journalled in said tube, a pump rotor slidably mounted on said tube and cooperating with a portion of said casing to form with a pair of side walls a plurality of pumping chambers therewith, the surface of said rotor including a plurality of cam portions, a plurality of reciprocable gates mounted in said casing and dividing said chambers into high and low pressure chambers, fluid inlet and outlet passages communicating with said chambers, one of said side walls being movable to vary the displacement of said pump chambers in accordance with changes in the torque load on said drive shaft, and means coupling said drive shaft and said rotor and operative upon a variation in torque load on said shaft to actuate additional means to move said movable side wall and vary the capacity of said chambers to re-establish the predetermined torque load upon said drive shaft, said coupling means comprising a helically grooved shaft journalled in said drive shaft, rollers mounted on said drive shaft and projecting into said grooved shaft to effect a rotation and axial movement thereof upon deviation of drive shaft torque from a predetermined amount, a key fixed to said grooved shaft and coupling said rotor thereto, and resilient means having a predetermined force acting against said key to prevent relative rotation of said drive shaft and said grooved shaft at a predetermined torque load thereon; said additional means comprising a fluid adjusting motor mounted on said tube and having a rigid connection with said movable side wall, a valve plate mounted about said tube and adapted to be axially moved by said coupling means, a plurality of valves fixed to said plate and adapted to control fluid flow to the rotor of said adjusting motor, said rotor being constructed and arranged to effect axial movement of said adjusting motor upon rotation of the rotor in response to fluid pressure admitted by said valves.

CLEBURNE BARNES HATFIELD.

REFERENCES CITED

The following references are of record in the file of this patent:

UNITED STATES PATENTS

| Number | Name | Date |
|---|---|---|
| 445,318 | Leach | Jan. 27, 1891 |
| 711,662 | Herdman | Oct. 21, 1902 |
| 934,716 | Dodd | Sept. 21, 1909 |
| 1,172,412 | Saalfeld | Feb. 22, 1916 |
| 1,244,878 | Manly | Oct. 30, 1917 |
| 1,299,751 | Magie | Apr. 8, 1919 |
| 1,527,685 | Huwiler | Feb. 24, 1925 |
| 1,532,735 | Dickerson | Apr. 7, 1925 |
| 1,866,083 | Chevrolet et al. | July 5, 1932 |
| 2,073,101 | Fox | Mar. 9, 1937 |
| 2,097,309 | Sanders, Jr. | Oct. 26, 1937 |
| 2,145,872 | Glenn | Feb. 7, 1939 |
| 2,279,008 | Nathan | Apr. 7, 1942 |
| 2,318,337 | Schlosser | May 4, 1943 |
| 2,330,565 | Eckart | Sept. 28, 1943 |
| 2,355,604 | Rupp | Aug. 15, 1944 |
| 2,362,420 | Tucker et al. | Nov. 7, 1944 |
| 2,462,974 | King | Mar. 1, 1949 |

FOREIGN PATENTS

| Number | Country | Date |
|---|---|---|
| 9,465 | Great Britain | July 4, 1887 |
| 295,541 | Italy | Apr. 25, 1932 |